United States Patent
Kojima et al.

(10) Patent No.: US 8,665,136 B2
(45) Date of Patent: *Mar. 4, 2014

(54) IMAGE PROCESSING DEVICE, RADAR APPARATUS EQUIPPED WITH THE SAME, METHOD OF PROCESSING IMAGE, AND IMAGE PROCESSING PROGRAM

(71) Applicant: Furuno Electric Company, Limited., Nishinomiya (JP)

(72) Inventors: Tatsuya Kojima, Nishinomiya (JP); Takumi Fujikawa, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,166

(22) Filed: Mar. 13, 2013

(65) Prior Publication Data

US 2013/0194129 A1     Aug. 1, 2013

Related U.S. Application Data

(63) Continuation of application No. 12/878,741, filed on Sep. 9, 2010, and a continuation of application No. 12/879,878, filed on Sep. 10, 2010, now Pat. No. 8,410,974.

(30) Foreign Application Priority Data

Sep. 11, 2009    (JP) ................. 2009-210973
Sep. 11, 2009    (JP) ................. 2009-210983

(51) Int. Cl.
    *G01S 13/00*      (2006.01)

(52) U.S. Cl.
    USPC .............. 342/41; 342/118; 342/133; 342/176

(58) Field of Classification Search
    USPC ......... 342/25 R–25 F, 41, 176, 179, 181–183
    See application file for complete search history.

(56) References Cited

U.S. PATENT DOCUMENTS 3,268,907 A * 8/1966 Parrish .............................. 346/8
3,697,987 A    10/1972 Arthur
3,717,873 A    2/1973 Riggs
4,224,621 A    9/1980 Cornett et al.

(Continued)

FOREIGN PATENT DOCUMENTS

JP     63-108288     5/1988
JP     2001-208830 A     8/2001

(Continued)

*Primary Examiner* — John B Sotomayor
*Assistant Examiner* — Marcus Windrich
(74) *Attorney, Agent, or Firm* — Birch, Stewart, Kolasch & Birch, LLP.

(57) ABSTRACT

This disclosure provides an image processing device, which includes a relative trail image memory for storing a relative trail data group indicating relative changes in position of a target object detected by echo signals obtained corresponding to detection signals transmitted while changing a transmitting azimuth direction, with respect to a transmitting position from which the detection signals are transmitted, and an approaching target object determination processing module for determining whether the target object detected with the detection signals is an approaching target object that approaches the transmitting position based on relative trail data existing on the same sweep line among the relative trail data group stored in the relative trail image memory.

18 Claims, 24 Drawing Sheets

(56) References Cited

U.S. PATENT DOCUMENTS

| | | | |
|---|---|---|---|
| 4,313,115 A | | 1/1982 | O'Sullivan |
| 4,623,966 A | * | 11/1986 | O'Sullivan .................. 701/301 |
| 5,065,161 A | * | 11/1991 | Shibutani .................... 342/176 |
| 5,307,074 A | | 4/1994 | Janex |
| 6,522,289 B1 | * | 2/2003 | Frerichs et al. ............. 342/176 |
| 7,817,079 B1 | | 10/2010 | Funk |
| 7,818,120 B2 | * | 10/2010 | Poreda et al. ............... 701/418 |
| 7,956,798 B2 | * | 6/2011 | Yanagi et al. ............... 342/176 |
| 2002/0080058 A1 | * | 6/2002 | Suzuki .......................... 342/22 |
| 2006/0290562 A1 | * | 12/2006 | Ehresman ..................... 342/41 |
| 2009/0315756 A1 | * | 12/2009 | Imazu et al. .................. 342/41 |
| 2011/0084870 A1 | * | 4/2011 | Kondo et al. ................. 342/41 |

FOREIGN PATENT DOCUMENTS

| | | |
|---|---|---|
| JP | 2003-48595 A | 2/2003 |
| JP | 2003-048595 A | 2/2003 |
| JP | 2003-337170 A | 11/2003 |

* cited by examiner

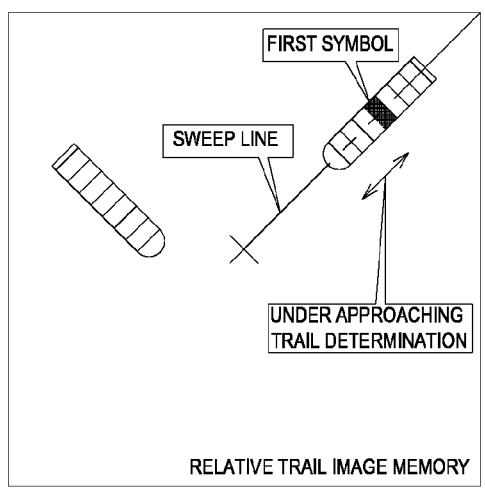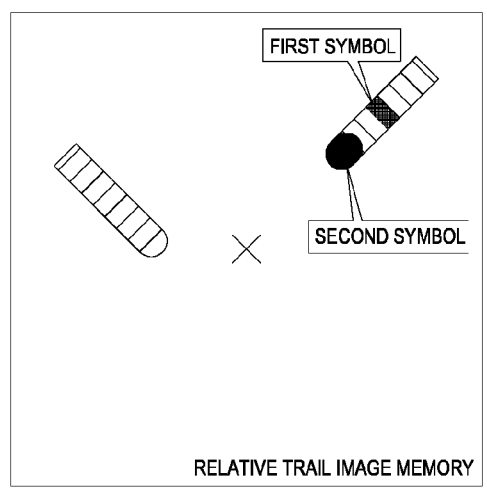
Fig. 16 A
Fig. 16 B

IMAGE PROCESSING DEVICE, RADAR APPARATUS EQUIPPED WITH THE SAME, METHOD OF PROCESSING IMAGE, AND IMAGE PROCESSING PROGRAM

CROSS-REFERENCE TO RELATED APPLICATION(S)

This application is a Continuation of copending application Ser. No. 12/878,741 filed Sep. 9, 2010 and copending application Ser. No. 12/879,878 filed Sep. 10, 2010, which claim priority under 35 U.S.C. §119, respectively, to Japanese Patent Application No. 2009-210983 filed Sep. 11, 2009 and Japanese Patent Application No. 2009-210973 filed Sep. 11, 2009, respectively, the entire contents of which are hereby incorporated by reference and for which priority is claimed under 35 U.S.C. §120.

TECHNICAL FIELD

The present invention relates to an image processing device for displaying information based on an obtained echo signal corresponding to a transmitted detection signal, as an image, and to a radar apparatus equipped with the image processing device, a method of processing the image, and an image processing program.

BACKGROUND

For navigation of ships, a method of detecting the presence of target objects around a ship (hereinafter, referred to as a "ship concerned") using a radar apparatus, which processes information based on an echo signal and displays the processed information as an image, to monitor positional relations between the target objects and the ship concerned is effective for avoiding collisions with other ships. Particularly, the use of the radar apparatus becomes essential in cases of poor visibility such as at nighttime and when dense fog appears. The aforementioned type of radar apparatus may be equipped with an image processing device which carries out appropriate processing to the information based on the echo signal to generate the images or the like to be displayed on a radar screen.

However, if an operator is unfamiliar with the radar images, then there have been cases where it is difficult to determine whether the sources of the echoes on the screen (displayed image showing the target objects) interfere with the navigation. On the other hand, even if the operator is familiar with the radar images, it is difficult to determine the risk of collision unless the operator looks at the screen for at least several scans.

Therefore, a radar apparatus equipped with Automatic Radar Plotting Aids (ARPAs), which assist in the use of the radar apparatus, may be used. The ARPAs have a function to calculate a course of another ship and a time its takes for the another ship to approach the nearest vicinity of the ship concerned based on information such as a relative position and a relative orientation of the ship concerned and the another ship obtained from the radar apparatus in real time. By displaying the calculation results on the screen, the information which is necessary to avoid collisions is provided for the operator so as to be visually easy to understand. JP2003-48595(A) discloses a radar apparatus equipped with this type of ARPAs.

JP2003-48595(A) discloses an other-ship display device configured to display with high visibility for ships having a high risk of collision and low visibility for ships having a low risk of collision. JP2003-48595(A) describes a display device capable of displaying a high visibility image which aids in avoiding collisions, which is the objective of this kind of device.

Further, another radar apparatus is also known, which is equipped with an alarm system for informing the operator about a target object approaching the ship concerned by activating an informing device such as a buzzer when the target object is detected within an alarm range set in advance on the screen.

Further, there is still another radar apparatus, which has a so-called trail function to display a current position and a trail (trail of movement) of another ship (target object) on the screen. Conventionally, a relative trail display mode which displays a relative change in position with respect to the ship concerned and an actual trail display mode which displays an absolute change in position, are known as the display modes of the aforementioned trail. In the relative trail display mode, the relative change in position of another ship with respect to the ship concerned is displayed as the trail on the screen. In the actual trail display mode, the actual change in position of the target object with respect to a stationary target object such as land appears on the screen as the trail, regardless of the movement of the ship concerned. The operator selectively uses these trail functions according to the situations and preferences, and uses it to predict the moving directions of other ships or to avoid collisions and the like.

The ARPAs disclosed in JP2003-48595(A) can display an intuitive and easy-to-understand on-screen information to avoid collisions with other ships. However, since technologically advanced processing, such as the acquisition and tracking operations of the target objects, are needed, internal processing becomes complex; thus, leading to large-scale circuits. Therefore, there is room for improvement in terms of lower manufacturing costs.

Here, the method for setting the alarm range in the radar apparatus has the merits in which there is no need to carry out the calculation and like as in the ARPAs, and the configuration which detects approaching of the target objects can be attained at low cost. However, since the target objects entering in the alarm range are simply determined as the approaching target objects, even when the target object, which moves away from the ship concerned and hence does not pose any risk of collision, enters the alarm range, the informing device is activated regardless of the situation.

Further, even when the target object approach is determined using the trail function, the following problems are present depending on the display modes. That is, in the relative trail display mode, the relative change in position of the target object with respect to the ship concerned is configured to be displayed by the trail; therefore, when the ship concerned is moving, even the stationary target objects which are not moving in reality are displayed as the trails. Therefore, in the ocean areas where there are a number of target objects, a number of trails are displayed on the display screen, and it is difficult to identify whether the target objects are moving target objects or stationary target objects. In this regard, however, since the absolute change in position of the target objects are configured to be displayed by a trail in the actual trail display mode, even when the ship concerned is moving, the stationary target objects such as land and the like are not displayed as trails. However, in this actual trail display mode, since the changes in actual position of other ships are displayed, it is difficult for the operator to intuitively determine if other ships are approaching the ship concerned like the relative trail display mode.

SUMMARY

The invention is made in light of the above circumstances and provides an image processing device having a simple configuration that can detect an approach of a target object and provides a configuration that carries out image processing so as to help an operator understand intuitively the existence of approaching target object, and also provides a radar apparatus equipped with the image processing device, a method of processing the image, and an image processing program.

According to an aspect of the invention, an image processing device is provided, which includes a relative trail image memory for storing a relative trail data group indicating relative changes in position of a target object detected by echo signals obtained corresponding to detection signals transmitted while changing a transmitting azimuth direction, with respect to a transmitting position from which the detection signals are transmitted, and an approaching target object determination processing module for determining whether the target object detected with the detection signals is an approaching target object that approaches the transmitting position based on relative trail data existing on the same sweep line among the relative trail data group stored in the relative trail image memory.

In the image processing device, the target object determined to be the approaching target object by the approaching target object determination processing module may be displayed so as to be distinguished from another target object.

In the image processing device, a relative trail of the target object may be displayed along with the target object based on the relative trail data group.

The image processing device may include an actual trail image memory for storing an actual trail data group indicating absolute changes in position of the target object detected with the echo signals. In the image processing device, an actual trail of the target object may be displayed along with the target object based on the actual trail data group.

In the image processing device, the relative trail or the actual trail of the target object determined to be the approaching target object by the approaching target object determination module may be displayed so as to be distinguished from another target object.

The relative trail data may be information that is generated per pixel constituting the relative trail image memory and vary in a stepwise fashion with a time elapsed after the target object is detected for the last time. The approaching target object determination processing module may determine, if the target object is detected on the sweep line, and if a value of the relative trail data varies while maintaining a continuity of the pixels on the sweep line in a direction apart from the transmitting position using a detection position as a starting point, and satisfying a predetermined condition, that the pixel is determined to be included in relative trail corresponding to the approaching target object.

The predetermined condition may be configured to be changeable.

The image processing device may include an approaching target object position acquisition module for finding a pixel at which the approaching target object of the relative trail currently exists based on the relative trail data group from the pixels determined to be included in the relative trail corresponding to the approaching target object by the approaching target object determination processing module.

The image processing device may include an alert range determination module for detecting the approaching target object existing within an alert range set in advance, and an informing module for operating when the approaching target object is detected by the alert range determination module.

The image processing device may be equipped in a radar apparatus.

According to another aspect of the invention, a method of processing an image is provided, which includes acquiring echo signals obtained corresponding to detection signals transmitted while changing a transmitting azimuth direction, storing a relative trail data group indicating relative changes in position of a target object detected with the echo signals, with respect to a transmitting position from which the detection signals are transmitted, and determining whether the target object detected with the detection signals is an approaching target object that approaches the transmitting position based on relative trail data existing on the same sweep line among the relative trail data group.

According to another aspect of the invention, an image processing program for causing a computer to execute processing is provided. The processing includes acquiring echo signals obtained corresponding to detection signals transmitted while changing a transmitting azimuth direction, storing a relative trail data group indicating relative changes in position of a target object detected with the echo signals, with respect to a transmitting position from which the detection signals are transmitted, and determining whether the target object detected with the detection signals is an approaching target object that approaches the transmitting position based on relative trail data existing on the same sweep line among the relative trail data group.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 16A and 16B are schematic views showing processing for writing a second symbol based on a first symbol;

DETAILED DESCRIPTION

Several embodiments according to the invention are described with reference to the appended drawings.

First Embodiment

Figure 1:
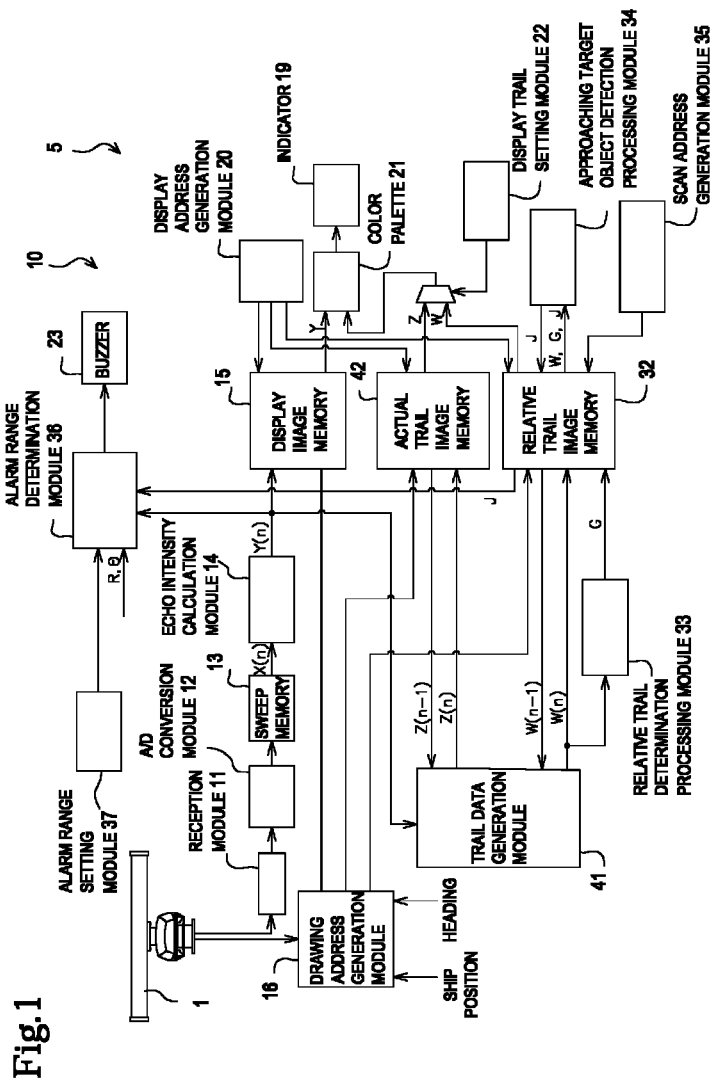
FIG. 1 is a block diagram schematically showing a configuration of a radar apparatus equipped with an image processing device according to a first embodiment of the invention.
Figure 2:
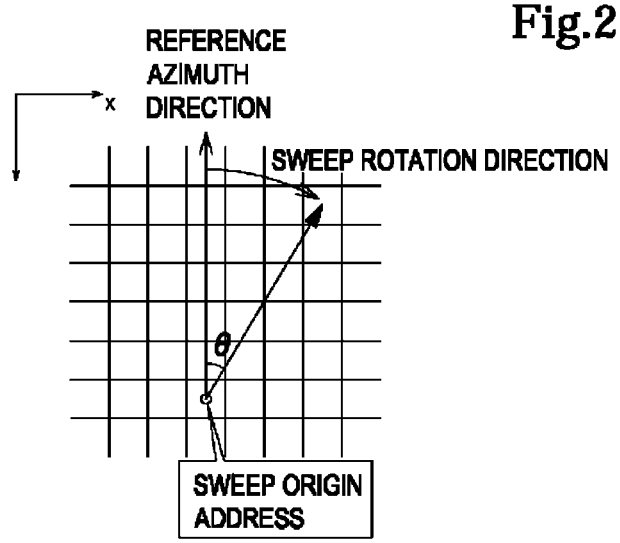
FIG. 2 is a schematic view showing a relation between a reference azimuth direction and a sweep angle.

FIG. 1 is a block diagram schematically showing a configuration of a radar apparatus 5 equipped with an image processing device 10, according to a first embodiment of the invention. FIG. 2 is a schematic diagram showing a relation between a reference azimuth direction and a sweep angle.

The radar apparatus 5 of the first embodiment is used as marine equipment for a ship (hereinafter, referred to as a "ship concerned"). As shown in FIG. 1, the radar apparatus 5 includes a radar antenna 1 and an indicator 19. Further, the radar apparatus 5 includes the image processing device 10 for processing an image. The image processing device 10 includes a reception module 11, an A/D conversion module 12, a sweep memory 13, an echo intensity calculation module 14, a display image memory 15, a drawing address generation module 16, a display address generation module 20, and a color palette 21.

The radar apparatus 5 has a function for displaying trails of other ships (trails of movement of target objects). In order to achieve this function, the image processing device 10 includes a trail data generation module 41, a relative trail image memory 32, an actual trail image memory 42, a relative trail determination processing module 33 (approaching target object determination processing module), an approaching target object detection processing module 34 (approaching target object position acquiring module), and a scanning address generation module 35.

The image processing apparatus 10 is configured to select either a relative trail display mode or an actual trail display mode as a display mode of the trail. In order to select the display mode, the image processing device 10 includes a display trail setting module 22. The relative trail display mode is a mode where a relative trail which indicates relative changes in the position of another ship with respect to the ship concerned are displayed on the indicator 19. In addition, the actual trail display mode is a mode where an actual trail which indicates absolute changes in the position of the other ship is displayed on the indicator 19.

Further, the radar apparatus 5 has an alarming function for announcing the risks to an operator by activating an alarming device when a target object approaching the ship concerned is detected. As a part of the constitution to implement this function, the image processing device 10 includes an alarm range determination module 36, an alarm range setting module 37, and a buzzer 23 (informing module).

Note that, in the following description, a target object, which is moving substantially straight toward the ship concerned when viewed relatively, is called an "approaching target object." When the approaching target object exist, and if at least one of the approaching target object and the ship concerned does not change the heading or speed, the approaching target object will collide with the ship concerned sometime in the future with a high possibility.

The radar antenna 1 is configured to transmit (radiate) a detection signal which is a pulse-shaped electric wave, and receive an echo signal which is a reflected wave of the transmitted electric wave. The radar antenna 1 rotates at predetermined intervals in a horizontal plane, and the detection signal is transmitted repeatedly at a cycle shorter than the rotation cycle, while changing the azimuth direction of the transmission.

The reception module 11 detects the reflected wave which is received by the radar antenna 1, amplifies it, and then outputs it to the A/D conversion module 12. The A/D conversion module 12 converts the analog signal transmitted from the reception module 11 into an appropriate digital signal.

The sweep memory 13 is configured to store the reception data for one sweep which are converted into the digital signal by the A/D conversion module 12. Note that the term "sweep" as used herein refers to a series of operations from the transmission of the detection signal to the transmission of the next detection signal, and the term "reception data for one sweep" as used herein refers to data which is received between a period after the detection signal is transmitted until the next detection signal is transmitted.

Since electric waves have a property to travel straight, the reception data for one sweep represents a situation laid on a single straight line drawn in a transmitting direction of the radar antenna 1 from the ship-concerned position as a starting point. Note that, when the radar antenna 1 transmits the detection signal in the direction of the straight line, the echo signal caused by the target object closer to the ship concerned is received at a sooner timing, and the echo signal caused by the target object farther from the ship concerned is received at a later timing. Therefore, the reception data for one sweep contains information of whether a target object exists on the straight line and information of a distance to the target object from the ship concerned in a case where there is the target object found on the straight line. The reception data for one sweep can be stored in the sweep memory 13 in chronological order.

The echo intensity calculation module 14 calculates an echo intensity at two or more points set at equal intervals in the reception data by reading the reception data for one sweep in chronological order from the sweep memory 13 and calculating an amplitude sequentially. This is substantially equivalent to detecting the echo intensity of the reflection wave at each of the plurality of set times in which the intervals are spaced at uniform periods of time from the point in time when the detection signal is transmitted from the radar antenna 1.

A group of data of the echo intensities acquired by the echo intensity calculation module 14 (hereinafter, the data group is referred to as an "echo intensity data group for one sweep") are outputted in chronological order to the display image memory 15, and are stored sequentially. Note that which pixels of the image data in the display image memory 15 is the echo intensity data group for one sweep stored is determined by the drawing address generation module 16. Further, in this embodiment, the echo intensity data group for one sweep is transmitted respectively to the trail data generation module 41 and the alarm range determination module 36, and is used to generate the trail data and to detect approaching target objects, described later.

The display image memory 15 is configured to be capable of storing the image data (raster data) having a plurality of pixel data to display images on the indicator 19. The image held by the display image memory 15 (hereinafter, referred to as a "display image") is implemented by a number of pixels arranged horizontally and vertically in a grid (M×N pixel matrix).

The display image data stored in the display image memory 15 is read out at an appropriate timing and is displayed by the indicator 19. The display image memory 15 can store information on the echo intensity and the like as the above-described pixel data for each pixel.

The drawing address generation module 16 (pixel position calculation module) can calculate a pixel position (address) in a corresponding display image for the respective echo intensity data which constitute the echo intensity data group for one sweep which is acquired by the echo intensity calculation module 14. A signal indicating a transmission angle θ of the radar antenna 1 when the detection signal is transmitted is inputted to the drawing address generation module 16. The drawing address generation module 16 calculates the pixel position corresponding to each echo intensity data based on the angle θ of the radar antenna 1 and a radar range by the following method.

That is, when the echo signal returns after a time "t" has elapsed from the time the detection signal was transmitted, it means that the electric wave shuttled a distance "r" between the radar antenna 1 and the target object during the time t. Therefore, if a polar coordinate system with the radar antenna 1 at the origin in a horizontal plane is defined, a position of the target object corresponding to the echo intensity when the time t has elapsed after the radar antenna 1 transmits the detection signal can be represented by $(r,\theta)=(c\times t/2,\theta)$ in the polar coordinate system as the antenna angle from a predetermined azimuth reference (for instance, north) when the detection signal is transmitted being θ. Here, "c" is the speed of light. Further, as shown in FIG. 2, the antenna angle θ in the polar coordinate system is set forth to become 0° when the radar antenna 1 is facing a predetermined azimuth direction (north), and a normal rotating direction of the radar antenna 1 is set forth to become positive. Note that, the drawing address generation module 16 is inputted with information from a GPS sensor and a gyro compass (both are omitted in the drawing) indicating a ship-concerned position and a bow azimuth direction (heading). Alternatively, the predetermined azimuth direction may be assumed as the heading.

Meanwhile, the display image held by the display image memory 15 is represented by the pixels arranged in the grid (matrix) as described above. In this embodiment, the position of each pixel in the display image is herein treated as a position in an X-Y rectangular coordinate system where the upper left corner of the image is assumed to be the origin, the right direction is taken as the X-axis, and the downward direction is taken as the Y-axis.

Then, the drawing address generation module 16 calculates a pixel position in the display image memory 15 where the information of the echo intensity is stored. Specifically, the pixel position (X, Y) is calculated by the following Equations (1) when the ship-concerned position (at the radar antenna 1) is assumed to be (Xs, Ys) in the X-Y rectangular coordinate system.

$$X = Xs + kt \times \sin\theta$$

$$Y = Ys - kt \times \cos\theta \quad (1)$$

Here, "t" is the elapsed time from the time point where the radar antenna 1 transmits the detection signal. "k" is a constant which is determined considering a size of a display area of the indicator 19 and the radar range, and "θ" is the antenna angle. Note that, since (X, Y) specifies the pixel position (address) which constitutes the display image, the fractions of the calculation results of X and Y below the decimal point are rounded appropriately.

In this embodiment, each data which constitutes the echo intensity data group for one sweep is outputted from the echo intensity calculation module 14 to the display image memory 15 in chronological order. Then, the drawing address generation module 16 calculates the pixel position (X, Y) corresponding to the respective echo intensity data sequentially according to the Equations (1), and outputs it to the display image memory 15, respectively. Therefore, when the echo intensity data group for one sweep is processed, the drawing address generation module 16 calculates (X, Y) repeatedly, assuming θ to be constant while increasing t from 0 in the Equations (1).

According to the above-described calculation, the position (X, Y), which represents the pixel in the display image corresponding to the echo intensity data group for one sweep by the X-Y rectangular coordinate system, is located on a straight line of the angle θ with respect to the ship-concerned position (Xs, Ys). Note that, in the following description, the straight line may be called a "sweep line" which represents a straight line formed by the reception data successive in the distance direction obtained from a single detection signal that is transmitted and received.

Therefore, the drawing address generation module 16 has a function to calculate the pixel position (X, Y) in the display image corresponding to a point on the above-described straight line (point on the sweep line). In addition, the drawing address generation module 16 has a function as a coordinate conversion module for converting the point (r, θ) on the sweep line represented by the polar coordinates to the pixel position (X, Y) in the X-Y rectangular coordinate system.

The pixel position (X, Y) obtained as the calculation result by the drawing address generation module 16 moves away gradually from the ship-concerned position (Xs, Ys) with the increase of t from 0, and this trail of movement draws a single straight line (the sweep line). The echo intensity data group for one sweep is stored as pixel data at the calculated pixel position to draw a single sweep line in the display image.

Further, an angle of the sweep line changes with the angle θ of the radar antenna 1 each time a single detection signal is transmitted.

Further, the drawing address generation module 16 of this embodiment generates a relative trail address and an actual trail address to write the trail data in the relative trail image memory 32 and the actual trail image memory 42. Details of the relative trail address and the actual trail address are described later.

Note that, in the description hereafter, the storing of the pixel information based on the echo intensity in the display image memory 15, the relative trail image memory 32, and the actual trail image memory 42 may be expressed as "drawing" in the pixel.

The display address generation module 20 generates a display address which is referenced when the image data is read out from the display image memory 15 and displayed on the indicator 19. The image data is read out when requested by the indicator 19. Note that the display address generation module 20 may generate a display address which is referenced when the trail data stored in the relative trail image memory 32 and the actual trail image memory 42 are read out and displayed on the indicator 19. Thereby, an actual trail or a relative trail can be appropriately displayed on the indicator 19 according to the setting of the display trail setting module 22.

The color palette 21 stores information for converting the pixel data of the display image inputted from the display image memory 15 into color information or brightness information. Further, the color palette 21 stores information on converting the trail data stored in the relative trail image memory 32 and the actual trail image memory 42 into the color information or the brightness information.

The indicator 19 is a raster-scan type display device constituted by a CRT, an LCD, etc. The display image data read out from the display image memory 15 is displayed by the indicator 19.

In the radar apparatus 5 which is constituted as described above, the echo intensity calculation module 14 obtains the echo intensity data group for one sweep based on the echo signals when the detection signals are transmitted from the radar antenna 1. Further, the drawing address generation module 16 sequentially calculates the plurality of pixel positions (in the X-Y rectangular coordinate system) to store the echo intensity data group for one sweep in the display image memory 15 based on the angle θ of the radar antenna 1 when the detection signal is transmitted.

Then, based on the results described above, each data constituting the echo intensity data group is stored in the display image memory 15 as pixel data, as if the sweep line at the angle θ is drawn in the display image held by the display image memory 15. By repeating the above-described processing while changing the angle θ of the radar antenna 1 gradually, one sweep line can be drawn at a time in the display image data of the display image memory 15, with respect to the ship-concerned position.

The image data obtained in such a manner is read out from the display image memory 15 at an appropriate timing, and after appropriate synthetic processing with other images and the like is performed, the image data is then displayed on the indicator 19. As a result, an image with a number of sweep lines radially drawn is displayed on the indicator 19, and a user can know a positional relation between the ship concerned and the surrounding target objects by viewing the image. With the rotation of the radar antenna 1, new sweep lines are repeatedly drawn in the image of the display image memory 15, and as a result, the image displayed on the indicator 19 is updated from time to time.

The trail data generation module 41 generates, based on the echo intensity data of one pixel (hereinafter, this data is referred to as an "echo data Y") which is inputted from the echo intensity calculation module 14, the trail data corresponding to the pixel. Pixel information, which determines a darkness of the image displayed on the screen of the indicator 19, is set to the trail data (intensity, or color tone or shade to exaggerate the trail data). Here, in this embodiment, the pixel information is represented by 8 bits (256 tones).

For example, the pixel information is set so that, when a target object has just passed the pixel, the trail is displayed darker (more intensity, or darker color tone or shade to exaggerate the trail) on the screen. On the other hand, when a long period of time has lapsed after the target object has passed the pixel, the pixel information is set so that the trail is displayed lighter (less intensity or less color tone or shade to not exaggerate the trail) on the screen. The trail data generated by the trail data generation module 41 in such a manner is transmitted to the relative trail image memory 32 as relative trail data W as well as to the actual trail image memory 42 as actual trail data Z.

The relative trail image memory 32 is a memory constituted by an SDRAM or the like, which can store a plurality of relative trail data W (relative trail data group) obtained during one rotation of the radar antenna 1. The trail data generated by the trail data generation module 41 is written in the relative trail image memory 32 according to the relative trail address generated by the drawing address generation module 16. The drawing address generation module 16 determines the address of the trail data so as to fix the ship-concerned position in the relative trail image memory 32. Therefore, the trail data is written at the address corresponding to the target object position with respect to the ship-concerned position, regardless of whether the ship concerned is moving or not (without considering a traveling distance of the ship concerned). As a result, the trail data is stored in the relative trail image memory 32 as the relative trail data W which is a distance-based synthesis between the ship concerned and another ship (represents relative changes in position of another ship with respect to the ship concerned). A relative trail is displayed on the screen based on the plurality of relative trail data W (relative trail data group) stored in the relative trail image memory 32.

The actual trail image memory 42 is a memory constituted by an SDRAM or the like, which can store a plurality of actual trail data Z (actual trail data group) obtained during one rotation of the radar antenna 1. The trail data generated by the trail data generation module 41 is written in the actual trail image memory 42 according to the actual trail address generated by the drawing address generation module 16. The drawing address generation module 16 determines the actual trail address of the trail data considering the traveling distance of the ship concerned. More specifically, the actual trail address is obtained by adding the traveling distance of the ship concerned to the relative trail address by an appropriate method. The trail data is stored in the actual trail image memory 42 by the actual trail address as the actual trail data Z indicating the changes in absolute position of another ship. An actual trail is displayed on the screen based on the plurality of actual trail data Z (actual trail data group) stored in the actual trail image memory 42. Since the traveling distance of the ship concerned is considered in the actual trail display mode, the trails of stationary target objects such as land and the like are not displayed like the relative trail display mode.

Note that the relative trail image memory 32 is constituted to store the presence of various symbols (a first symbol G and a second symbol J) described later for each pixel, in addition to the relative trail data group described above.

Figure 3:
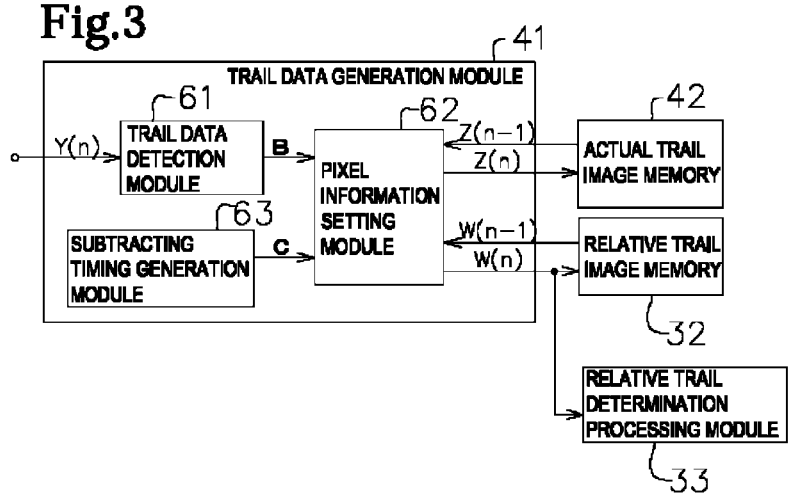
FIG. 3 is a block diagram showing a configuration of a trail data generation module.
Figure 4:
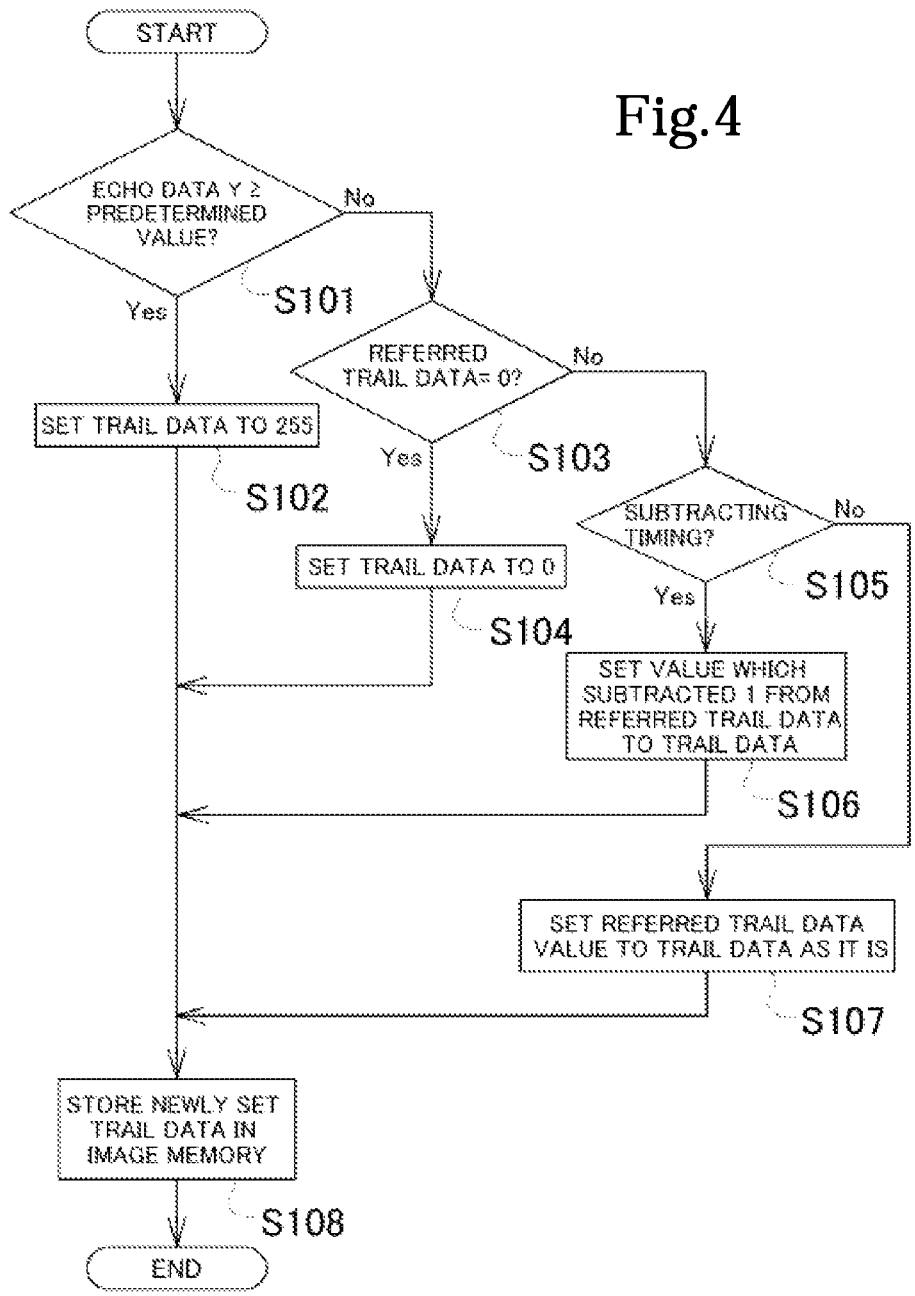
FIG. 4 is a flowchart showing processing for generating trail data based on echo data.
Figure 5:
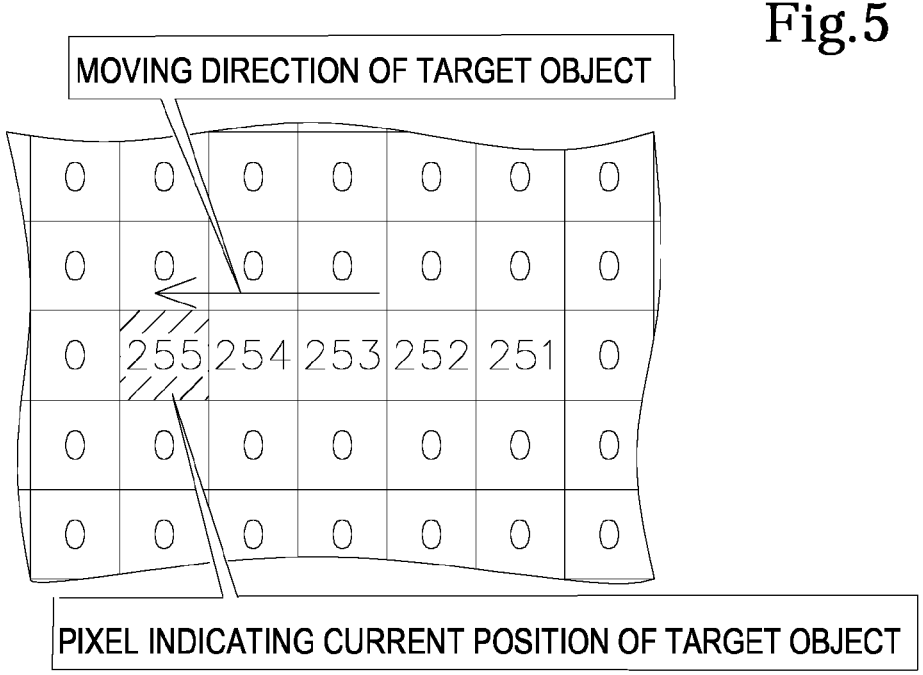
FIG. 5 is schematic diagram showing an example distribution of the trail data.

Next, the processing for generating the trail data is described with reference to FIGS. 3 to 5. FIG. 3 is a block diagram showing a configuration of the trail data generation module 41. FIG. 4 is a flowchart showing processing for generating the trail data based on the echo data Y. FIG. 5 is a schematic view showing an example distribution of the trail data.

As shown in FIG. 3, the trail data generation module 41 includes a trail data detection module 61, a pixel information setting module 62, and a subtracting timing generation module 63, as substantial components thereof.

The trail data detection module 61 is used for checking the existence of the target object within the pixel being processed, based on the echo data Y which is inputted from the echo intensity calculation module 14. In the trail data detection module 61, a set value A is set as a threshold, and the value of echo data Y is compared with this set value A to determine if there is a target object. More specifically, when the echo data Y is greater than the set value A, the trail data detection module 61 transmits a determination signal B (B=1), which indicates the existence of the target object in the pixel, to the pixel information setting module 62. When the value of the echo data Y is less than the set value A, the trail data detection module 61 transmits the determination signal B (B=0), which indicates the non-existence of the target object in the pixel, to the pixel information setting module 62.

The pixel information setting module 62 generates the trail data which becomes the base of the actual trail data Z and the relative trail data W. The value of the trail data corresponding to the elapsed time is set by the pixel information setting module 62. The value of the trail data is set to a value corresponding to the elapsed time by being subtracted at regular intervals.

The subtracting timing generation module 63 determines the timing for subtracting the value of the trail data, and transmits a timing signal C to the pixel information setting module 62. The subtracting timing generation module 63 transmits the timing signal C=1 only during one sweep made by the radar antenna 1 for each of the predetermined cycles, and transmits the timing signal C=0 at all other times. When the timing signal value is 1 and a predetermined condition is satisfied, the trail data generation module 41 subtracts the value of the trail data.

The new trail data is generated sequentially by this configuration using the processing for each pixel. Specifically, when the pixel information setting module 62 receives the determination signal B=1 from the trail data detection module 61, the predetermined value which indicates the existence of the target object in the corresponding pixel is set as the trail data. Here, the pixel information described above is stored as 8 bits integer value data (256 tones of 0 to 255) in this embodiment, and the predetermined value described above which indicates the existence of the target object is 255. Therefore, 255 is written as the trail data in the pixel which is determined to be the existence of the target object. Further, when the determination signal B=0 is received and the actual trail data Z is to be calculated, the new actual trail data Z(n) is written in the actual trail image memory 42 after referring to the actual trail data Z(n−1) of the past in the actual trail image memory 42. Similarly for the relative trail data W, when the determination signal B=0 is received, the new relative trail data W(n) is calculated based on the relative trail data W(n−1) of the past obtained from the relative trail image memory 32, and the relative trail data W(n) is written in the relative trail image memory 32.

Next, the generation of the trail data is described with reference to the flowchart of FIG. 4. In the following description, the generation of the relative trail data W is described as an example. The flow shown in FIG. 4 begins when the echo data Y is inputted from the echo intensity calculation module 14 to the trail data generation module 41. First, the trail data detection module 61 checks whether the echo data Y is greater than the set value A, and then transmits the determination result to the pixel information setting module 62 (S101).

When the pixel information setting module 62 receives the determination signal B (B=1), which indicates that the echo data Y is greater than the set value A, it sets the relative trail data W(n) to the maximum value of 255 (S102). On the other hand, when the pixel information setting module 62 receives the determination signal B (B=0) which indicates the echo data Y is less than the set value A, it refers the relative trail data W(n−1) stored in the relative trail image memory 42 and checks whether the value is 0 (S103).

When the relative trail data W(n−1) of the past referred at S103 is 0, the pixel information setting module 62 sets the value of 0 as the new relative trail data W(n) (S104). On the other hand, when the relative trail data W(n−1) of the past referred at the processing of S103 is not 0, the pixel information setting module 62 checks whether it is the subtracting timing of the value of the relative trail data W(n−1) based on the timing signal C (S105).

When it is the subtracting timing (C=1) of the value of the relative trail data W(n−1), the pixel information setting module 62 sets a value derived by subtracting 1 from the referred relative trail data W(n−1) of the past to the new relative trail data W(n) (S106). As a result, the value of the pixel information changes only by one tone. For example, when the value of the referred relative trail data W(n−1) of the past is 255, the newly setting value of the relative trail data W(n) will be 254. On the other hand, when it is not the subtracting timing (C=0), the pixel information setting module 62 sets the referred value of the relative trail data W(n−1) of the past to the relative data W(n) as it is, without changing the value (S107).

The pixel information setting module 62 stores the relative trail data W(n) which is set using any one of the processing of S102, S104, S106 and S107 in the relative trail image memory 32 in accordance with the relative trail address described above (S108). The trail data generation module 41 carries out the above-described processing for every pixel and then stores the relative trail data W (relative trail data group) for one full screen obtained during one rotation of the radar antenna 1 in the relative trail image memory 32.

The actual trail data Z can be obtained from processing similar to the flowchart of FIG. 4. When the actual trail data Z is to be processed, all the processing are similar except for the point where the address generated by the drawing address generation module 16 is the actual trail address and the point where the actual trail data Z(n−1) of the past, which is referred during the generation of the new actual trail data Z(n), is read out from the relative trail image memory 42. The actual trail data Z obtained during one rotation of the radar antenna 1 (actual trail data group) can be stored in the actual trail image memory 42 by repeating above-described processing for every pixel.

FIG. 5 is a schematic view showing the example distribution of the actual trail data Z which is stored in the actual trail image memory 42. As described above, in the pixel where the target object is currently present, the pixel information value is set to 255. The values between 254 and 251 shown in FIG.

5 are data representing the trail. Further, the pixels in which the actual trail data Z are set to 0 indicate that the target object was not present within the predetermined time. In FIG. 5, the pixel information value of the actual trail data Z decreases by one each time advancing to the pixel on the right side from the pixel currently showing the target object. Thus, it is understood that with every one cycle of the subtracting timing, the target object advances to the left side on the screen by one pixel at a time.

Figure 6:
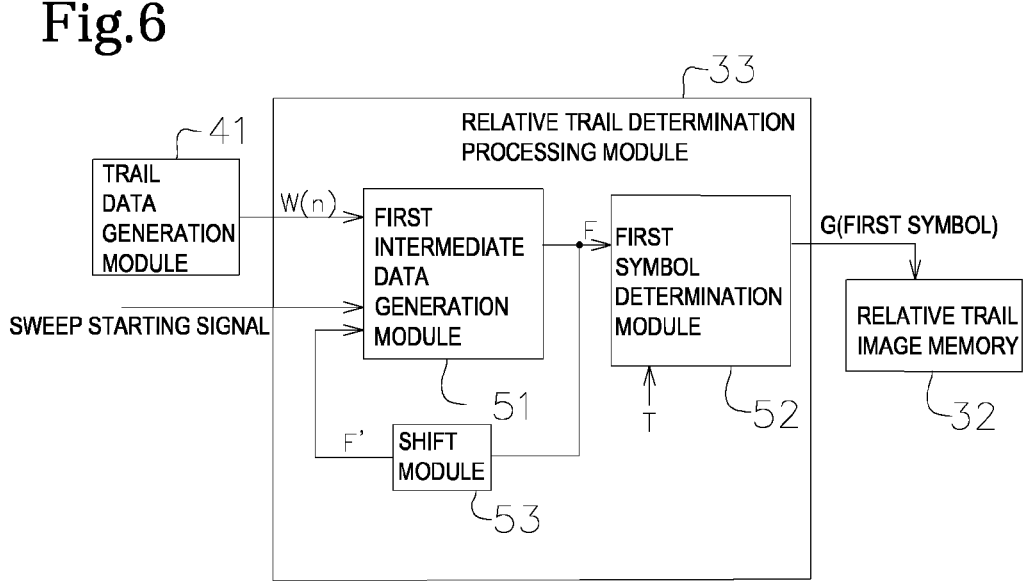
FIG. 6 is a block diagram showing a configuration of a relative trail determination processing module.
Figure 7:
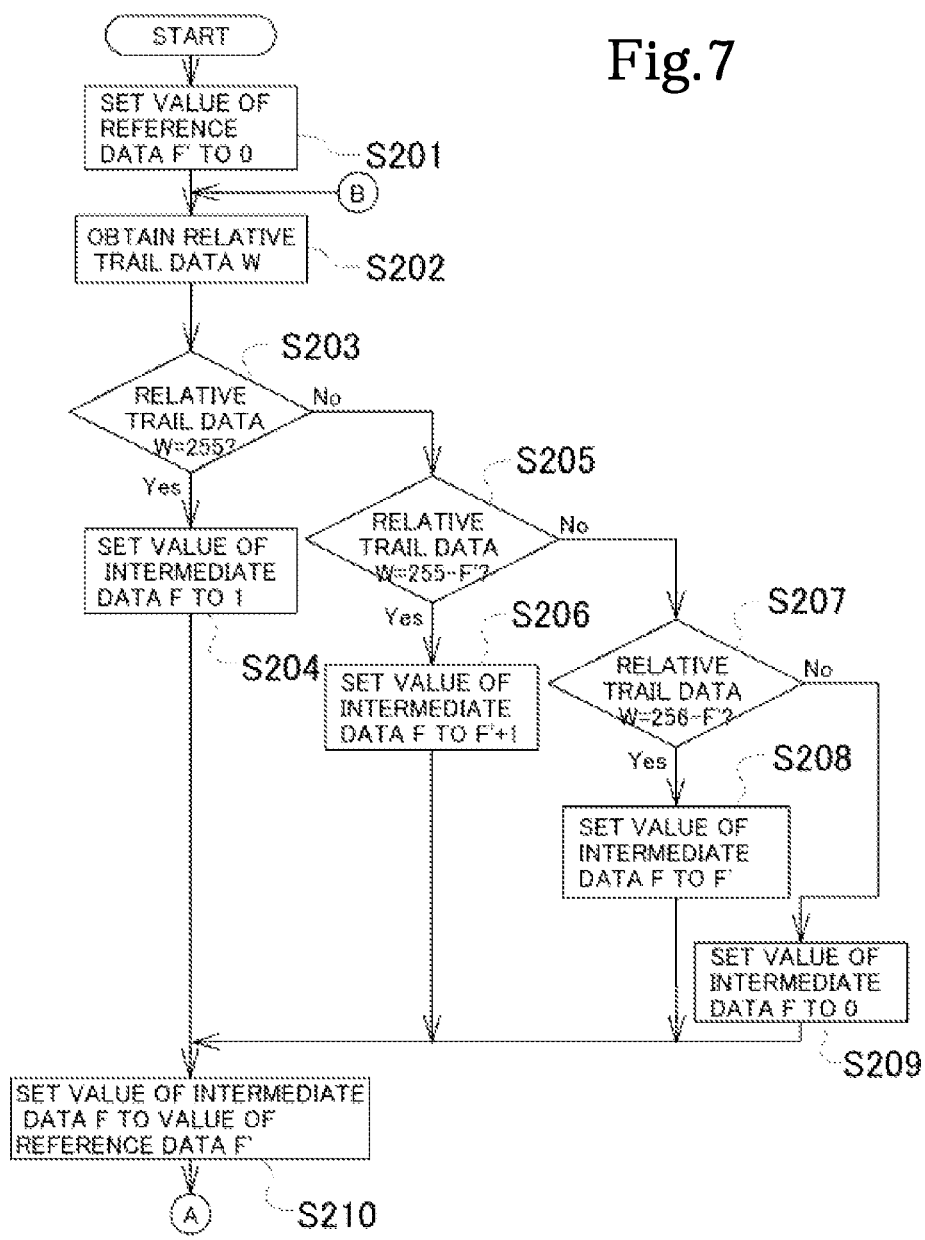
FIG. 7 is a flowchart showing the first half of processing for determining an approach of a target object by the relative trail determination processing module.
Figure 8:
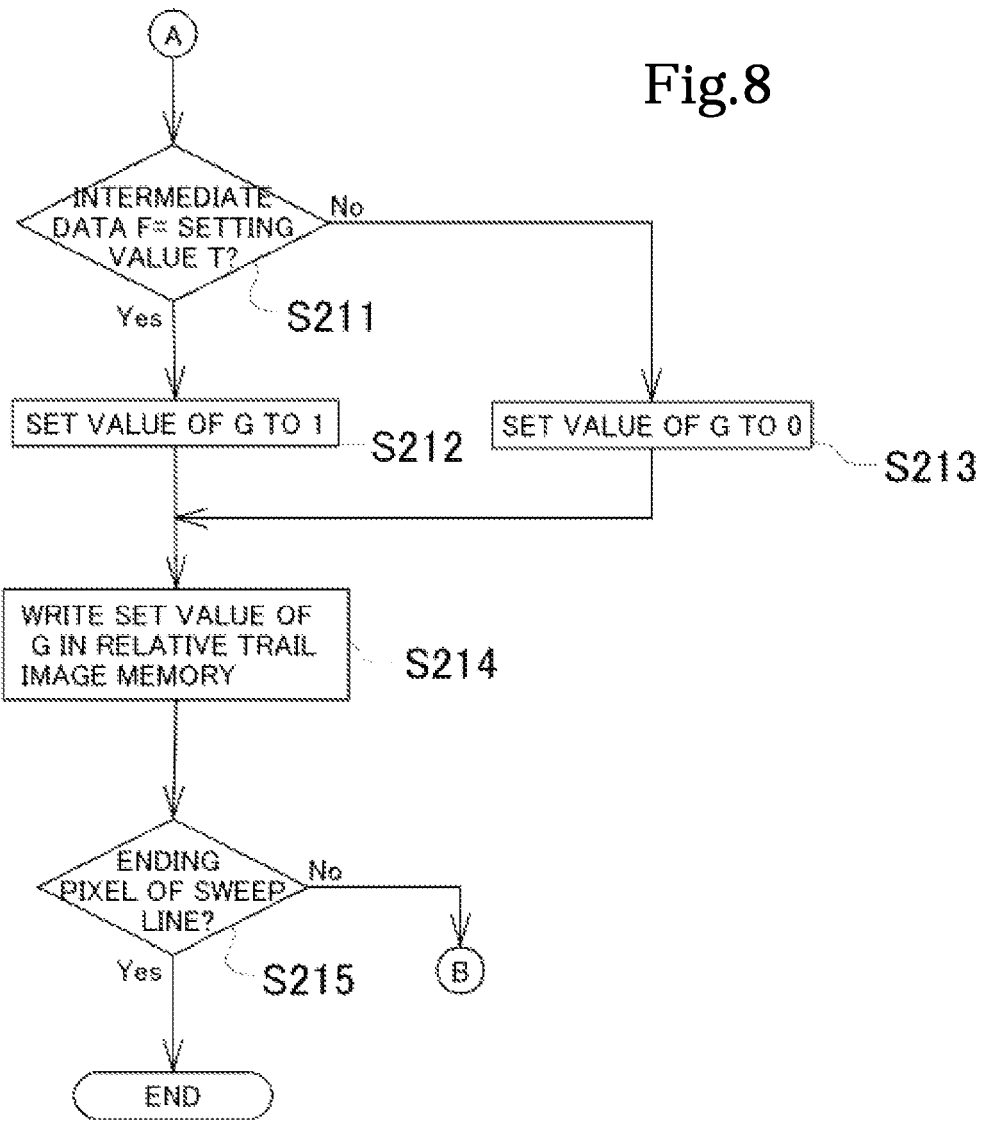
FIG. 8 is a flowchart showing the second half of the processing for determining the approach of the target object by the relative trail determination processing module.

Next, the detection processing of an approaching target object by the relative trail determination processing module 33 will be described with reference to FIGS. 6 to 8. FIG. 6 is a block diagram showing a configuration of the relative trail determination processing module 33. FIGS. 7 and 8 is a flowchart showing processing for determining the approaching target object by the relative trail determination processing module 33.

The relative trail determination processing module 33 detects the target object approaching the ship concerned based on the relative trail data W inputted from the trail data generation module 41. As shown in FIG. 6, the relative trail determination processing module 33 includes a first intermediate data generation module 51, a first symbol determination module 52 (intermediate data determination module), and a shift module 53, as substantial components thereof.

Incidentally, the pixel on the sweep line is sequentially drawn outward from the origin of the sweep (center). For each new pixel to be drawn on the sweep line, the relative trail data W(n) corresponding to the pixel is inputted from the trail data generation module 41 to the first intermediate data generation module 51. The first intermediate data generation module 51 generates intermediate data F to determine the approaching target object based on the relative trail data W(n) of the pixel which is present on the sweep line. The intermediate data F generated by the first intermediate data generation module 51 is outputted to the first symbol determination module 52 and the shift module 53. The method of generating the intermediate data F is described later in detail.

On the basis of the intermediate data F, the first symbol determination module 52 determines if the target object corresponding to the trail stored in the relative trail data W is the approaching target object (that is, when viewed relatively, the target object which is moving straight toward the ship concerned). In other words, the first symbol determination module 52 determines if the pixel corresponding to the inputted relative trail data W is included in the relative trail corresponding to the approaching target object. Then, the first symbol determination module 52 determines if the first symbol G is to be provided according to the result of the aforementioned determination and then writes it to the relative trail image memory 32.

A predetermined set value T is set in the first symbol determination module 52, and the determination described above is carried out by comparing the intermediate data F with the set value T. More specifically, the first symbol determination module 52 writes a flag value (G=1) which indicates that the first symbol G is marked, at a corresponding address of the relative trail image memory 32, when the value of the intermediate data F becomes the set value T. On the other hand, in a case of the value other than the set value T, it writes a flag value (G=0) which indicates that the first symbol G is not marked, at the corresponding address of the relative trail image memory 32. The set value T is configured such that the operator can change it using a non-illustrated user interface equipped in the radar apparatus 5 (image processing device 10).

The shift module 53 is constituted using a delay circuit such as a shift register, and it delays the intermediate data F inputted from the first intermediate data generation module 51, and then outputs it to the first intermediate data generation module 51 as reference data F'.

Using the configuration described above, the first intermediate data generation module 51 generates the new intermediate data F based on the relative trail data W(n) inputted as required and the reference data F' which is the intermediate data F of the past.

Next, the processing for detecting the approaching target object is described with reference to the flowchart of FIGS. 7 and 8. If the first intermediate data generation module 51 detects the starting of the new sweep line drawing, the flow of FIG. 7 is started. First, the first intermediate data generation module 51 carries out initialization processing for setting the value of the reference data F' to 0 (S201 of FIG. 7). Next, the relative trail data W corresponding to the pixels drawn is obtained from the trail data generation module 41 (S202). The first intermediate data generation module 51 checks whether the value of the relative trail data W of the pixel obtained is 255 (the value indicating the existence of the target object) (S203). When the value of the relative trail data W is 255, the value of the intermediate data F is set to 1 (S204).

On the other hand, when the value of the relative trail data W is not 255 from the determination at S203, the first intermediate data generation module 51 checks whether the value of the relative trail data W is identical to a value obtained after subtracting the value of F' from 255 (S205). Then, when the value of the relative trail data W is identical to the value obtained after subtracting the value of F' from 255, a value obtained after adding 1 to the reference data F' is set to the value of the intermediate data F (S206). For example, when the obtained relative trail data W is 254 and the reference data F' is 1, and if the value of the reference data F' is subtracted from 255, it becomes 255−1=254 and therefore it matches with the value of the relative trail data W. In this case, the value of the intermediate data F is set to a value obtained after adding 1 to the value of reference data F' (1+1=2).

When it is determined from the determination at S203 that the value of the relative trail data W is not 255 and it does not satisfy the condition of S205 (W≠255−F'), processing of S207 is carried out. At S207, the first intermediate data generation module 51 checks whether the value of the relative trail data W is identical to the value obtained after subtracting the value of F' from 256. When the value of the relative trail data W is identical to the value obtained after subtracting the value of F' from 256, the value of the reference data F' is set as it is to the value of the intermediate data F (S208). On the other hand, from the determination at S207, when the value of the relative trail data W is not identical to the value obtained after subtracting the value of F' from 256 (W≠256−F'), the value of the intermediate data F is set to 0 (S209).

The relative trail determination processing module 33 sets the value of the intermediate data F set according to the processing of S204, S206, S208 or S209 to the value of the reference data F' used while generating the intermediate data F for the next pixel on the sweep line (S210). Next, the first symbol determination module 52 checks whether the value of the intermediate data F and set value T are identical (S211 in FIG. 8). When the value of the intermediate data F is identical to the set value T, the first symbol determination module 52 determines that the first symbol G is to be marked on the pixel and sets the value of G to 1 (S212). When the value of the intermediate data F and the set value T are different, the value of G is set to 0 (S213).

The first symbol determination module 52 writes the value of G set according to the processing of S212 or S213, to the address corresponding to the relative trail image memory (S214). Then, the processing from S202 to S214 are repeated until the sweep line drawing is finished (S215). When the drawing of the ending point pixel at the farthermost position from the origin is finished, the flow indicated in FIGS. 7 and 8 is terminated at once. When the new sweep line is drawn, the above-described flow starts once again. This processing is repeated every time the sweep line is drawn.

Next, a relation between the set value T and the approaching target object is described with reference to FIGS. 9A to 9D. FIGS. 9A to 9D are schematic views which indicate example distributions of the relative trail data W when the sweep angle θ is 90°, and transitions of the value of the intermediate data F. In FIGS. 9A to 9D, the values of the relative trail data W are indicated for every pixel, and the values of the intermediate data F in such cases are indicated using numerals with parentheses. Further, in this example, the value of T set in the first symbol determination module 52 is set to 6.

Figure 9:
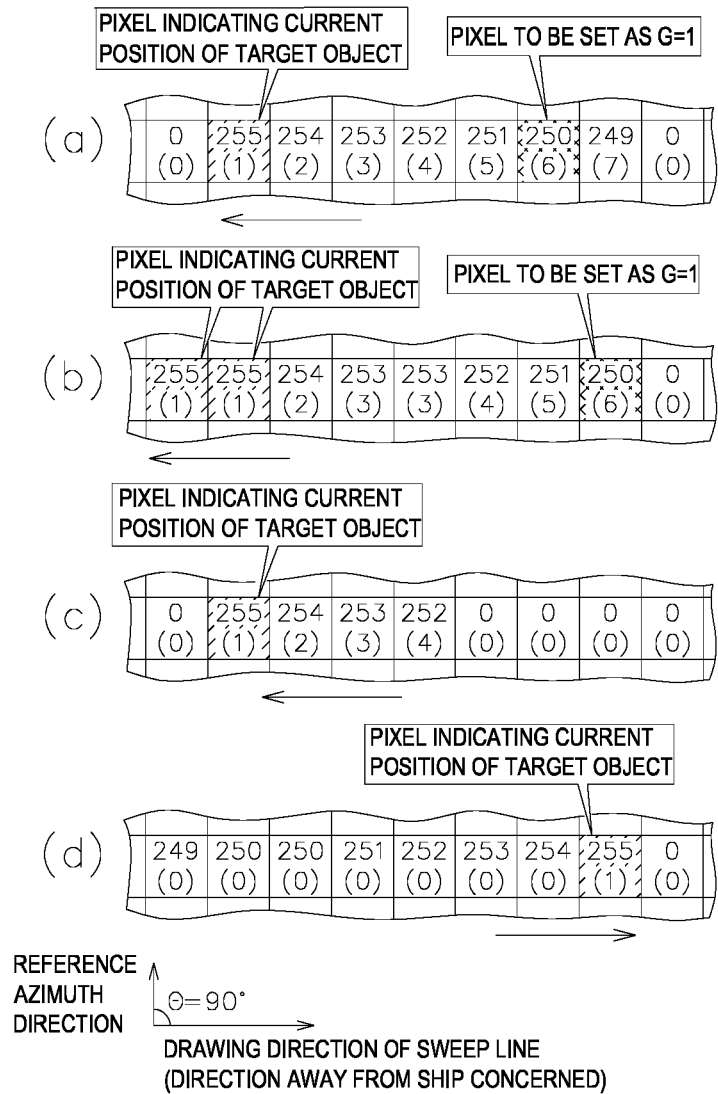
FIGS. 9A to 9D are schematic diagrams showing example distributions of relative trail data and transitions of values of intermediate data.

FIG. 9A shows the distribution of the relative trail data W when the target object having a size of 1 pixel is approaching toward the ship concerned and the transition of the intermediate data F. Note that FIG. 9A indicates only some of the pixels on the sweep line. As shown in FIG. 9A, the values of the relative trail data W are arranged from left to right in order of 0, 255, 254, 253, 252, 251, and 249.

The value of the relative trail data W is inputted in order following the drawing direction of the sweep line for the relative trail determination processing module 33. The value of the intermediate data F increases by 1 as the input value of the relative trail data W decreases by 1 from 255 for example, when the value of the relative trail data W is inputted as 255, the value of the intermediate data F becomes 1 (processing of S204 in FIG. 7) and then when 254 is inputted, the value of the intermediate data F becomes 2 (processing of S206 in FIG. 7), etc. In FIG. 9A, the transition of the value of the intermediate data F is shown so as to correspond to the relative trail data W. The intermediate data F changes to 0, 1, 2, 3, 4, 5, 6, and 7 when a value of the relative trail data W is inputted one by one. Then, the first symbol G (G=1) is set at a pixel where the value of the intermediate data F becomes 6. The first symbol G represents that the pixel is positioned at an intermediate part of the relative trail of the approaching target object (in other words, the pixel is included in the relative trail of the approaching target object).

FIG. 9B shows a distribution of the relative trail data W when the target object having a size of 2 pixels is approaching toward the ship concerned and a transition of the intermediate data F. The values of the relative trail data W are arranged from left to right in order of 255, 255, 254, 253, 253, 252, 251, and 250.

In this example, the value of the intermediate data F becomes 1 when 255 is inputted as the value of the relative trail data W (processing of S204 in FIG. 7), next when 255 is inputted, the value of the intermediate data F becomes 1 (processing of S206 in FIG. 7), next when 254 is inputted, the value of the intermediate data F becomes 2 (processing of S206 in FIG. 7), next when 253 is inputted, the value of the intermediate data F becomes 3 (processing of S206 in FIG. 7). In FIG. 9B, the value of 253 which is the same as the value of the previous relative trail data W is inputted as the value of the next relative trail data W, and in this case, the value of the intermediate data F becomes 3 which is the same value as the value set one before (processing of S208 in FIG. 7). Next, when 252 is inputted, the value of the intermediate data F becomes 4 (processing of S206 in FIG. 7) and similarly the value of the intermediate data F changes for the rest. Therefore, as shown in FIG. 9B, the intermediate data F changes for every input of the value of the relative trail data W as 1, 1, 2, 3, 3, 4, 5, and 6. Then, the first symbol G (G=1) is set to the pixel where the value of the intermediate data F becomes 6.

FIG. 9C shows a distribution of the relative trail data W when the target object having a size of 1 pixel is approaching toward the ship concerned and a transition of the intermediate data F. The value of the relative trail data W is arranged from the left to right in order of 0, 255, 254, 253, 252, 0, and 0.

In this example of the relative trail data W, the intermediate data F changes in order of 0, 1, 2, 3, 4, 0, 0, and 0. In this way, even if another ship is heading toward the ship concerned, when the value of the relative trail data W is such that it does not continue beyond a prescribed number of times, there are no pixel set to G=1, since the value of the intermediate data F does not reach the value of 6. Therefore, in the state shown in FIG. 9C the approaching target object will not be detected.

FIG. 9D shows example distributions of the relative trail data W and the intermediate data F when the target object having a size of 1 pixel is moving away from the ship concerned. The values of the relative trail data W are arranged from left to right in order of 249, 250, 250, 251, 252, 253, 254, and 255.

In this example of the relative trail data W, the intermediate data F changes in order of 0, 0, 0, 0, 0, 0, 0, and 1. In this way, the value of the intermediate data F is set to zero for the trail of the target object moving in the direction away from the ship concerned. Therefore, the fact that there is an approaching target object which is indicated by G=1 is not set in any pixel. Thereby, even if the value of the relative trail data W is continuous on the sweep line, when the target object is moving in a direction away from the ship concerned, no approaching target object will be detected.

As described above, the relative trail determination processing module 33 of this embodiment checks whether the value of the relative trail data W decreases in the direction separating from the ship concerned on the sweep line from the position at which the pixel (255) indicating the presence of the target object is detected, to a predetermined value, while the value of the relative trail data W maintaining the continuity. Then, when such a relation is detected, G=1, which indicates that a pixel is included in the relative trail of the approaching target object, is set in the pixel for which the value of the relative trail data W has reached the predetermined value.

Note that the target object shown in FIG. 9C may be detected as the approaching target object by setting the set value T described above to a smaller value (T≤4). In this way, the set value T represents a criterion for detecting the approaching target object, where the sensitivity for detecting the approaching target object can be adjusted by changing the set value T. For example, in the cases of FIGS. 9A and 9B, when the set value T is set within a range of T≥8, since the value of the relative trail data W becomes 0 before the value of the intermediate data F reaches 8, the relative trails of the approaching target objects are not detected.

Next, the detection of the current position of the approaching target object by the approaching target object detection processing module 34 is described. That is, even if the first symbol G is marked on a certain pixel, it only represents that the approaching target object existed in the pixel at a time point of the past, and the current position of the approaching target object is unknown. Then, the current position of the approaching target object is obtained by the approaching target object detection processing module 34. Note that, the following processing is carried out as independent processing from the processing for drawing the sweep line.

The approaching target object detection processing module 34 searches a pixel, where the first symbol G (G=1) is set, from the group of the relative trail data W stored in the relative trail image memory 32 and tracks the relative trail data W in a predetermined direction considering the pixel as a trigger pixel to detect the current position of the approaching target object. The values of the group of the relative trail data W and the value of the first symbol G stored in the relative trail image memory 32 can be searched for every pixel in order corresponding to the change in the address (pixel position) generated by the scanning address generation module 35.

Figure 10:
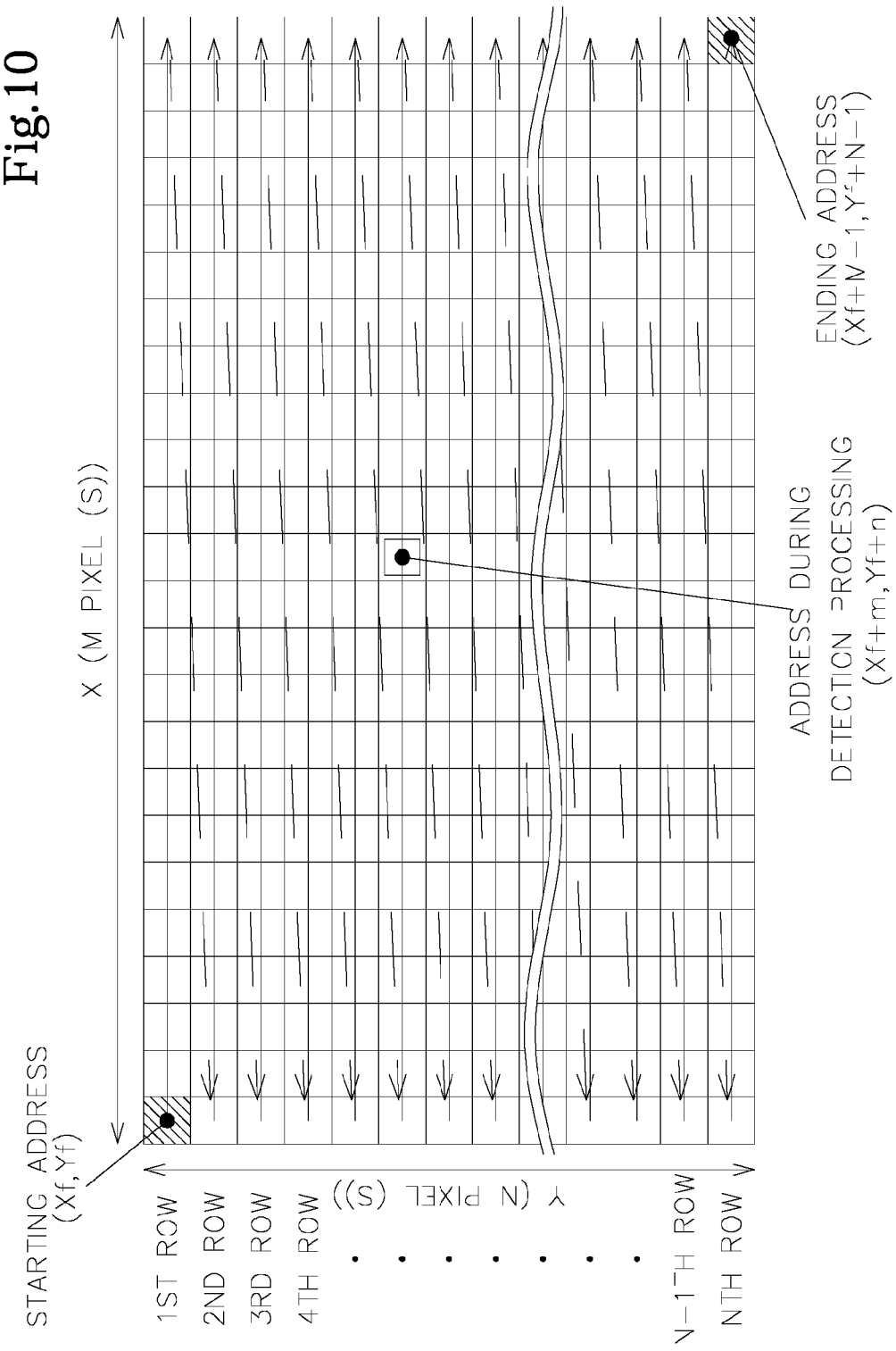
FIG. 10 is a schematic diagram showing detection processing according to an address determined by a scanning address generation module.
Figure 11:
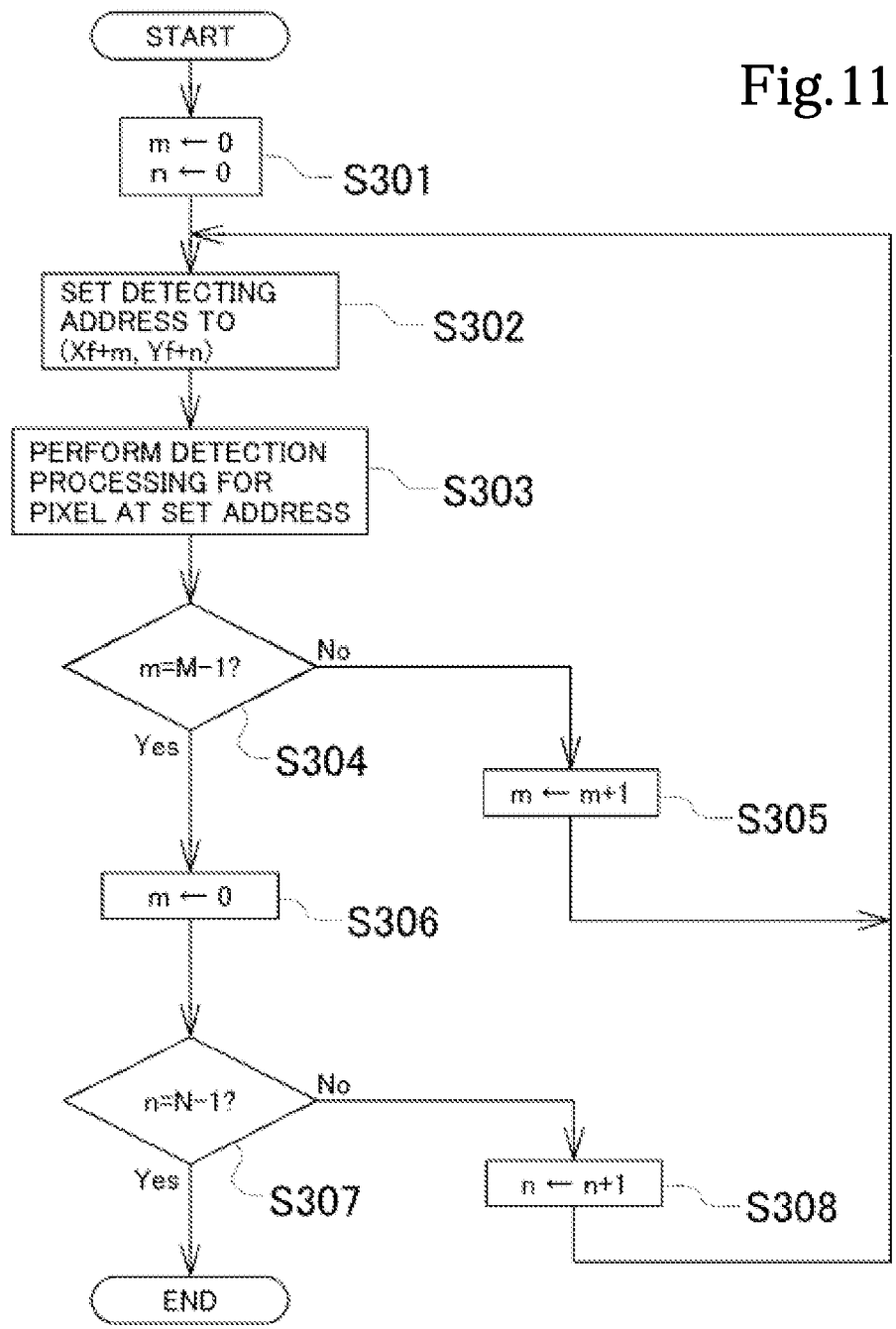
FIG. 11 is a flowchart showing processing for generating the address by the scanning address generation module.

First, determination of a position of a pixel to be detected will be described with reference to FIGS. 10 and 11. FIG. 10 is a schematic view showing the detection processing in accordance with the address determined by the scanning address generation module 35. FIG. 11 is a flowchart showing the processing for generating the address using the scanning address generation module 35.

The scanning address generation module 35 sequentially determines the address to specify all pixels stored in the relative trail image memory 32. First, in the relative trail image memory 32, an address of a starting pixel from which the detection processing starts (starting address) is set, and an address of an ending pixel at which the detection processing ends (ending address) is set. The starting pixel is set to one of the pixels arranged on the four corners of the relative trail data group of the relative trail image memory 32. The ending pixel is set to a pixel at a position diagonal to the pixel where the starting pixel is set. Note that, in this embodiment, as shown in FIG. 10, since the processing is carried out sequentially from the starting pixel to the ending pixel, the starting pixel side is called an upstream side and the ending pixel side is called a downstream side in the following description, respectively, focusing on the flow of this processing.

In the example shown in FIG. 10, the starting pixel is set to the upper left corner pixel and the ending pixel is set to the lower right corner pixel in the relative trail image memory 32 where the M×N pixels are arranged in the X-Y rectangular coordinate system. As shown in the example of FIG. 10, the start address of the starting pixel is (Xf, Yf) and the ending address of the ending pixel is (Xf+M−1, Yf+N−1). When the variables "m" (M>m≥0) and "n" (N>n≥0) are used in this configuration, the pixel address in the detection processing can be represented by (Xf+m, Yf+n). The starting pixel belongs to the first line, and the ending pixel belongs to the Nth line. The term "line" as used herein means a horizontal line (direction parallel to the X-axis direction).

The detection processing is described in detail with reference to FIG. 11. When the processing starts, the variables m and n which determine the scanning address are set to 0, respectively (S301). Next, the scanning address generation module 35 determines the address (X, Y) of the pixel for which the detection processing is carried out, according to X=Xf+m and Y=Yf+n (S302). For example, in the first-time processing, since m=0 and n=0 are set, the initially set address becomes (Xf, Yf) and it matches with the address of the starting pixel. Next, the detection processing is carried out for the pixel at the address set by the processing of S302 (S303).

Next, the detection processing checks whether m=M−1 (S304), and if m≠M−1, then 1 is added to the value of m (S305) and the processing returns to S302. On the other hand, if m=M−1, since the pixel for which the detection processing was carried out at S303 is the pixel at the right end, the value of m is set to 0 (S306). Then, in order to determine if the pixel for which the detection processing was carried out is at the ending address, the detection processing checks whether n=N−1 (S307). If n≠N−1, since it is not at the ending pixel, 1 is added to the value of n (S308) and the processing returns to S302. On the other hand, from the determination obtained from S307, if it is determined that the ending address is reached (n=N−1), then this processing is terminated.

According to the flow described above, the detection processing of S303 is repeated sequentially for pixel by pixel until the detection processing reaches the ending pixel from the starting pixel. As a result, the relative trail data W of all the pixels which are stored in the relative trail image memory 32 will be processed.

Figure 12:
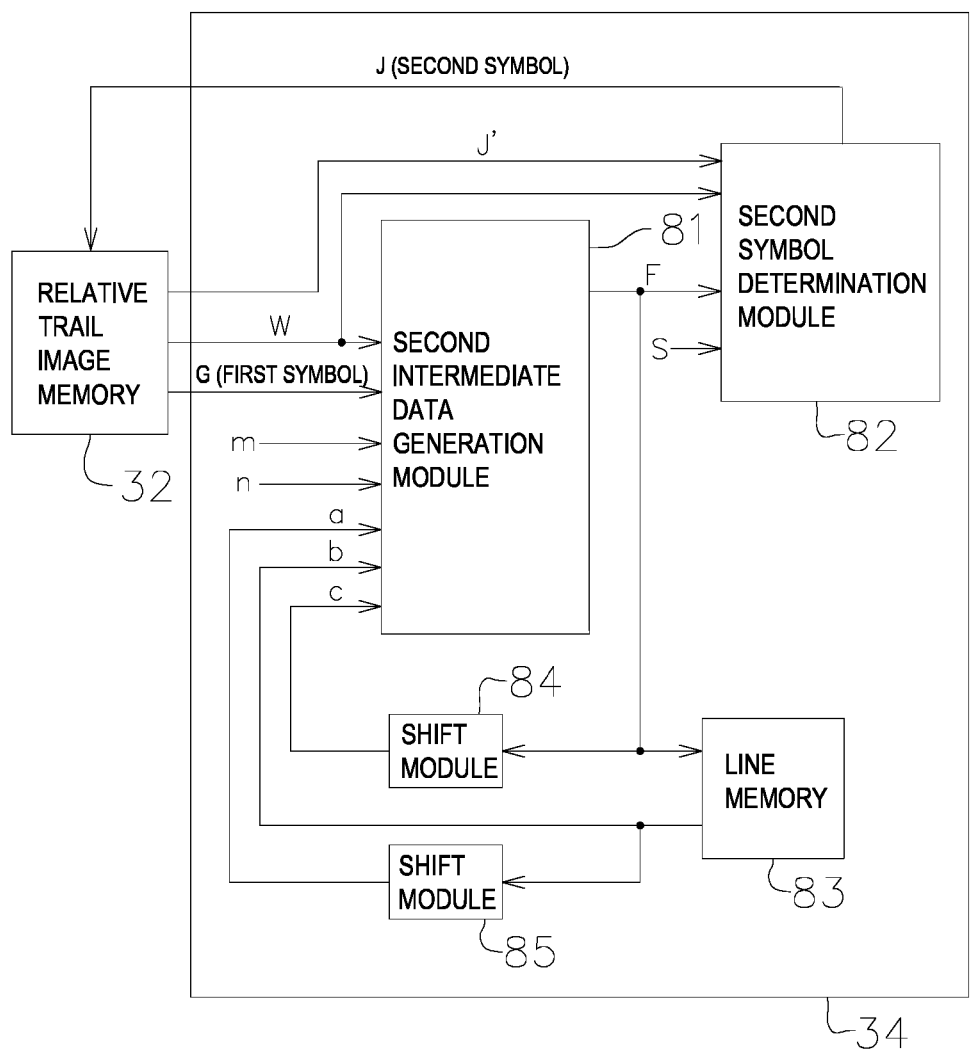
FIG. 12 is a block diagram showing a configuration of an approaching target object detection processing module.
Figure 13:
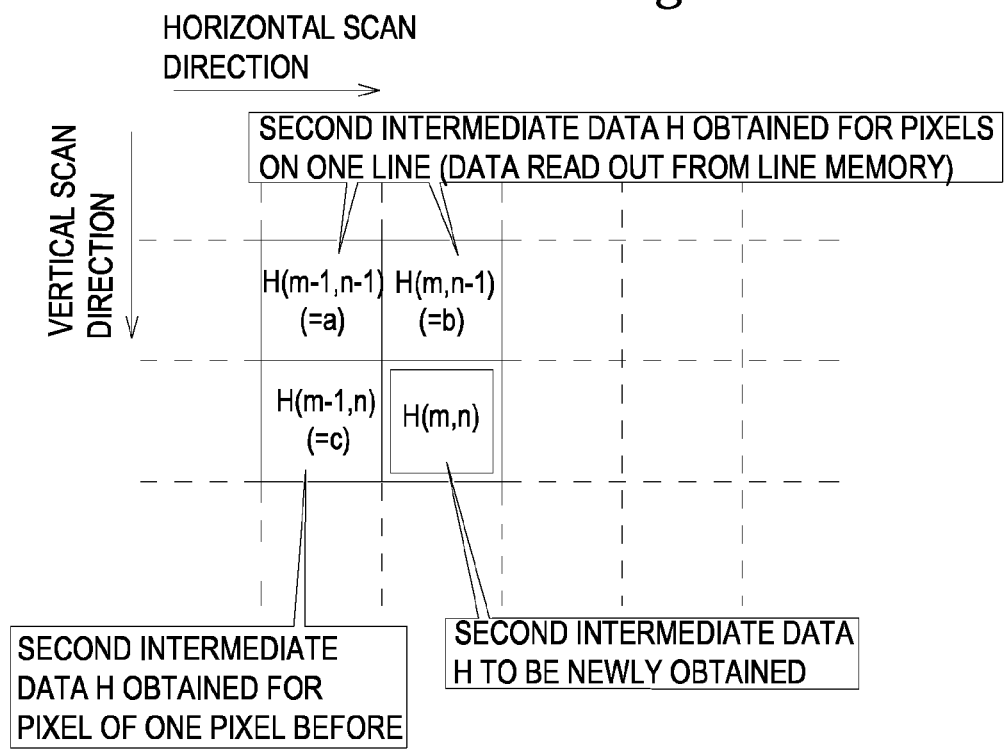
FIG. 13 is a schematic view showing positional relations between pixels used for comparison and a detecting pixel in the relative trail detection processing.
Figure 14:
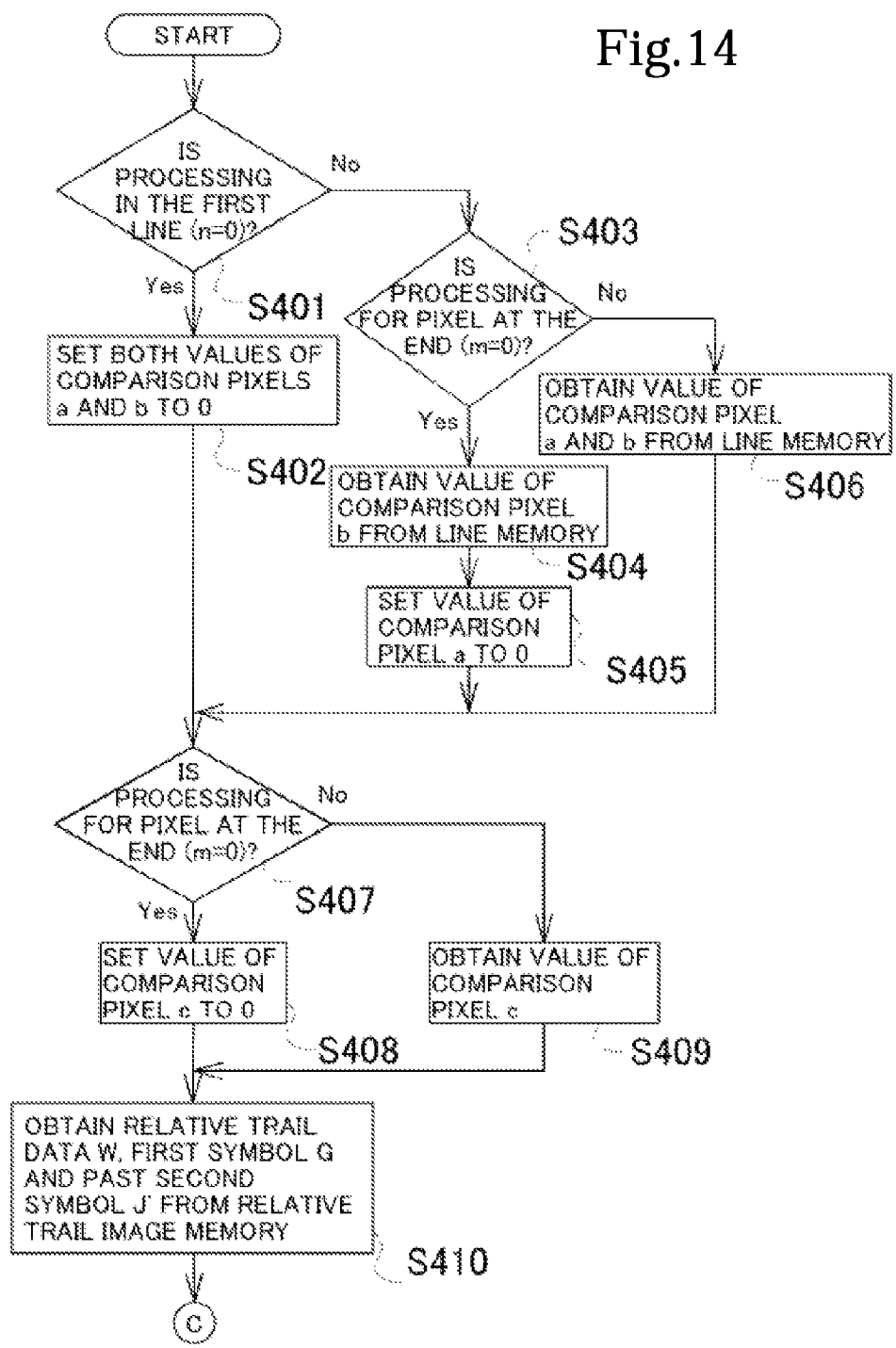
FIG. 14 is a flowchart showing the first half of processing for detecting a position of the target object by the approaching target object detection processing module.
Figure 15:
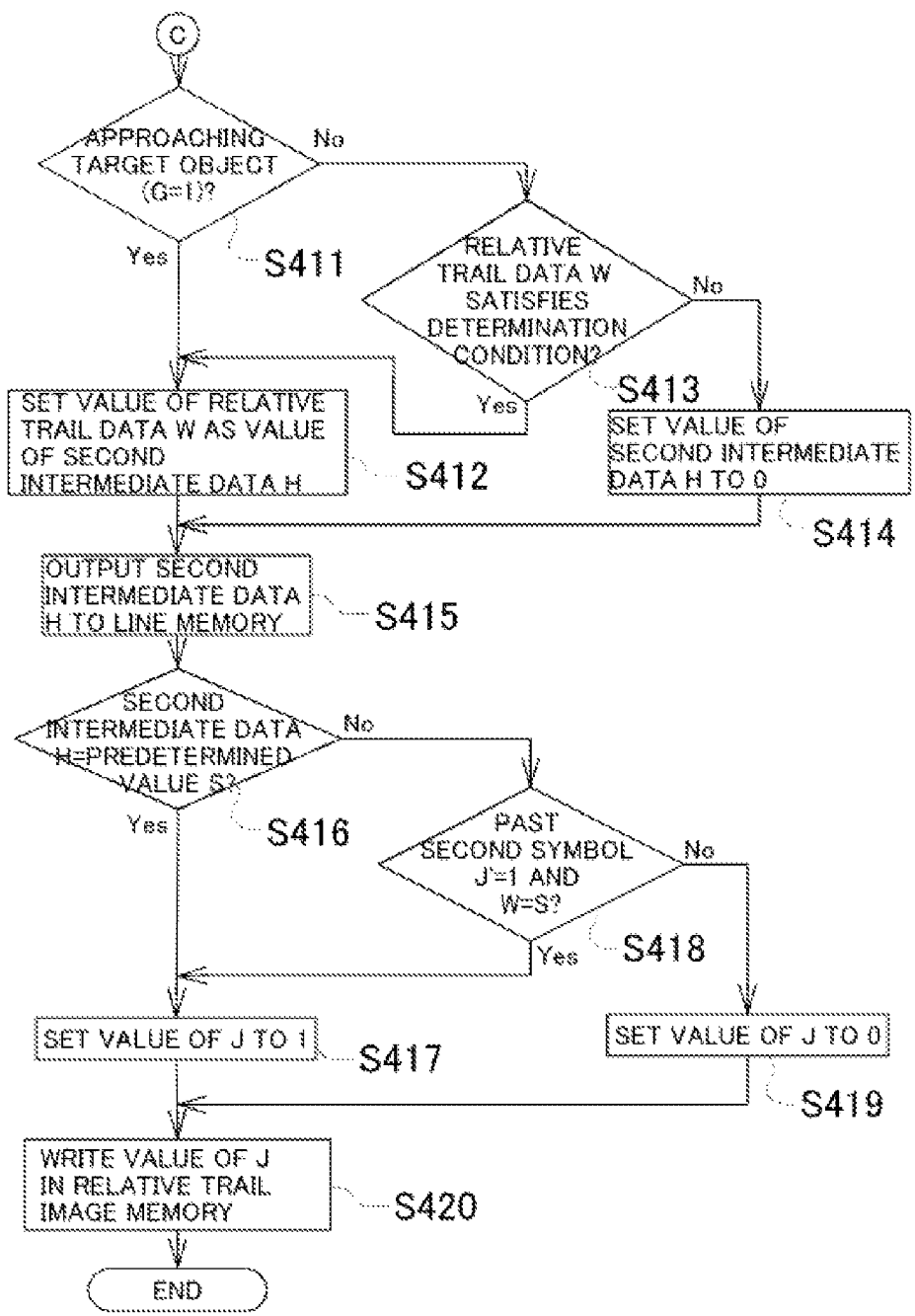
FIG. 15 is a flowchart showing the second half of the processing for detecting the position of the target object by the approaching target object detection processing module.

Next, the detection processing by the approaching target object detection processing module 34 is described in detail with reference to FIGS. 12 to 15. FIG. 12 is a block diagram showing a configuration of the approaching target object detection processing module 34. FIG. 13 is a schematic view showing positional relations between comparison pixels a, b and c and the pixel undergoing the detection processing. FIGS. 14 and 15 are a flowchart showing the processing for detecting the position of the target object by the approaching target object detection processing module 34.

As shown in FIG. 12, the approaching target object detection processing module 34 includes a second intermediate data generation module 81, a second symbol determination module 82, a line memory 83 and two shift modules 84 and 85 as substantial components thereof.

The second intermediate data generation module 81 generates a second intermediate data H for the second symbol determination module 82 for determining the existence of the target object. The relative trail data W and the data G related to the existence of the first symbol are inputted from the relative trail image memory 32 to the second intermediate data generation module 81. Further, the variables m and n (refer to FIG. 10) are inputted to the second intermediate data generation module 81, for specifying the address of the pixel for which the detection processing is carries out. Note that the pixel for which the detection processing is currently carried out (pixel specified by the values m and n) may be called a "detecting pixel" in the following description.

To the second intermediate data generation module 81, the values of the second intermediate data H of the comparison pixels a, b and c which are located near the detecting pixel are inputted, respectively. The positional relations between the detecting pixel and the comparison pixels a, b and c are described by using FIG. 13. Note that FIG. 13 shows the positional relations between the detecting pixel and the comparison pixels when the starting pixel is set to the pixel at the upper left corner and the ending pixel is set to the pixel at the lower right corner. As shown in FIG. 13, the comparison pixel c is a pixel which has just undergone the detection processing and is adjacent to the detecting pixel on the left side (upstream side in the X axis direction). The comparison pixels a and b are pixels which belong to the line adjacent to and above the line to which the detecting pixel belongs (upstream side in the Y-axis direction). Amongst these, the comparison pixel b is adjacent to and above the detecting pixel (upstream side in the Y-axis direction) and the comparison pixel a is adjacent to the comparison pixel b on the left side (upstream side in the X-axis direction) and adjacent to and above the comparison pixel c (upstream side in the Y-axis direction).

The position of the comparison pixel is relatively determined according to the position of the starting pixel in relation to the detecting pixel. For example, when the starting pixel is set to the pixel at the lower right corner, the comparison pixel c is located on the right side of the detecting pixel and the comparison pixel b is located below the detecting pixel. The comparison pixel a is located on the right side of the comparison pixel b and located below the comparison pixel c. In this way, the comparison pixel a becomes the nearest pixel to the starting pixel among the detecting pixel and the comparison pixels a, b and c. On the other hand, the detecting pixel becomes the nearest pixel to the ending pixel among the detecting pixel and the comparison pixels a, b and c.

The second intermediate data generation module 81 generates the second intermediate data H based on these data and then transmits the second intermediate data H to the second symbol determination module 82. Further, the generated second intermediate data H is transmitted to the line memory 83 and the shift module 84 to be used during the generation of new second intermediate data H as reference data (values of the comparison pixels a, b and c).

When it is detected that the first symbol G (G=1) is marked on the detecting pixel, the second intermediate data generation module 81 sets the relative trail data W of the detecting pixel as the value of the second intermediate data H. For example, when G=1 is set in the pixel for which the value of the relative trail data W is 250, 250 is set to the value of the second intermediate data H.

Further, the second intermediate data generation module 81 compares the value of the relative trail data W of the detecting pixel and the value of the comparison pixel described above, and when a predetermined determination condition is satisfied, sets the value of the relative trail data W of the detecting pixel as the value of second intermediate data H. More specifically, when the value of the relative trail data W (hereinafter, simply referred to as "W" in the description given below) is identical to at least one of the values of the comparison pixels a, b and c or is greater than the comparison pixel values by 1, the second intermediate generation module 81 determines that the determination condition is satisfied. Note that this requires that the values of the pixels to be compared are not 0.

In other words, the second intermediate generation module 81 determines three conditions described below. That is, (1) for the value of the comparison pixel a, when a≠0, whether a relation of the relative trail data W=a or W=a+1 is established, (2) for the value of the comparison pixel b, when b≠0, whether a relation of W=b or W=b+1 is established, and (3) for the value of the comparison pixel c, when c≠0, whether a relation of W=c or W=c+1 is established. Then, if at least one of the relations of (1) to (3) is established, it can be concluded that the determination condition is satisfied. For example, when the relative trail data W of the detecting pixel is W=251 and the values of the comparison pixels are a=0, b=0, and c=250, respectively, the determination condition is satisfied since the relation of (3) described above is established, and the value of the second intermediate data H is then set to 251.

The second symbol determination module 82 is configured to determine if the detecting pixel is a pixel where the approaching target object is currently present, by comparing a predetermined value S set in advance with the value of the second intermediate data H. Note that, in the description hereafter, the pixel currently having the approaching target object is called as an "approaching target object existing pixel." Then, the second symbol determination module 82 determines whether the second symbol J is to be marked according to the determination result described above and then writes to the relative trail image memory 32. Note that, the relative trail data W and second symbol J' of the past is inputted from the relative trail image memory 32 along with the second intermediate data H, to the second symbol determination module 82.

In detail, the second symbol determination module 82 writes a flag value (J=1), which indicates that the second symbol J is marked, on a corresponding address of the relative trail image memory 32 when the detecting pixel is determined to be the approaching target object existing pixel described above. On the other hand, when the detecting pixel is not the approaching target object existing pixel, the second symbol determination module 82 writes a flag value (J=0), which indicates that the second symbol is not marked, to the corresponding address of the relative trail image memory 32. Note that a value which is the same as the value of the relative trail data W indicating the existence of the target object in the pixel is set to the predetermined value S. In this embodiment, the value of 255, which is the maximum value for the relative trail data W and indicates the existence of the target object, is set to the predetermined value S.

The line memory 83 is configured to be able to store the second intermediate data H inputted from the second intermediate data generation module 81 for one line. The second intermediate data generation module 81 can read out the values of the comparison pixels a and b from the line memory 83. Both the shift modules 84 and 85 are delay circuits constituted by a shift register or the like, respectively. The shift module 84 delays the inputted second intermediate data H and outputs it as the value of the comparison pixel c to the second intermediate data generation module 81. The shift module 85 delays the inputted data from the line memory 83 and outputs it as the value of the comparison pixel a to the second intermediate data generation module 81.

The second intermediate data generation module 81 checks a continuity of the relative trail data W in a predetermined direction, and when the determination condition is satisfied, the second intermediate data H corresponding to the relative trail data W is set in the detecting pixel. Therefore, it can be said that the second intermediate data H is data which indicates that the relative trail data W has the continuity in the predetermined direction. Further, since the same value as the value of the relative trail data W is set to the second intermediate data H, and when the second intermediate data H becomes identical to the predetermined value S, it is indicated that the relative trail data W continue in the predetermined direction from the pixel marked with the first symbol G to the pixel in which the target object of the relative trail corresponding to the first symbol G exists.

Note that the term "predetermined direction" as used herein means a predetermined angular range including the predetermined direction. For example, when the starting pixel is set to the pixel at the upper left corner (in the case of FIG. 13), and the approaching target object is detected when it is moving directly to the right side, to the lower side, and to the lower right side (ending pixel side) when relatively viewed from the ship concerned.

As described above, the positional relations between the comparison pixels and the detecting pixel are determined according to the position of the starting pixel. Therefore, when the approaching target object existing pixel can be detected, a direction of the movement of the approaching target object will be as follows according to the position of the starting pixel. That is, when the starting pixel is set to the pixel at the upper right corner, if the approaching target object is moving relatively to the left, downward, and to the lower left, the pixel currently having the approaching target object (approaching target object existing pixel) can be detected. When the starting pixel is set to the pixel at the lower right corner, if the approaching target object is relatively moving to the left, upward, and to the upper left, the pixel currently having the approaching target object can be detected. When the starting pixel is set to the pixel at the lower left corner, if the approaching target object is relatively moving to the right, upward, and to the upper right, the pixel currently having the approaching target object can be detected.

Therefore, the pixel currently having the approaching target object can be detected from the pixel marked with the first symbol G, and the second symbol J can be marked by carrying out the detection processing after setting the starting pixel at the four respective corners, irrespective of the direction to which the approaching target object is relatively moving toward the ship concerned. In this embodiment, the detection processing is repeated for four times while changing the starting pixel position in order to detect the current position of the approaching target object moving in all the directions. That is, the detection processing of the current location of the approaching target object is carried out for each predetermined direction for which the movement of the target object is detected, by changing the positional relations between the comparison pixels and the detecting pixel. Note that, this change in the scan direction is described below.

Next, specific processing for marking the second symbol J on a pixel as needed is described with reference to a flowchart of FIGS. 14 and 15. Note that, for the description referring to FIGS. 14 and 15, the position (address) of the starting pixel is set at the upper left corner and the position (address) of the ending pixel is set at the lower right corner.

When the detection processing for the current location of the approaching target object is started, the flow of FIG. 14 starts. First, the second intermediate data generation module 81 checks whether the processing is in the first line by checking whether the value of n for defining the Y coordinate (Yf+n) of the detecting pixel is 0 (S401). When n=0, in other words, when the processing is in the first line, the values of the comparison pixels a and b are set to 0 (S402). When n≠0 (second line onwards), the second intermediate data generation module 81 checks whether the value of m is 0 for checking whether the pixel to be processed is at the left end (S403). When m=0, in other words, when the pixel to be processed is at the left end, the second intermediate data generation module 81 obtains the value of the comparison pixel b stored in the line memory 83 in advance (S404), and sets the value of the comparison pixel a to 0 (S405). On the other hand, when m≠0, the second intermediate data generation module 81 obtains the values of the comparison pixels a and b stored in the line memory 83 in advance (S406).

Next, the second intermediate data generation module 81 sets the value of the comparison pixel c according to the value of m. More specifically, the second intermediate data generation module 81 checks whether the value of m for determining the X coordinate (Xf+1) of the detecting pixel is 0 (S407). When m=0, the second intermediate data generation module 81 sets the value of the comparison pixel c to 0 (S408). On the other hand, when m≠0, the second intermediate data generation module 81 sets the value of the second intermediate data H of one pixel before which is delayed by the shift module 84 to the value of the comparison pixel c (S409).

Next, the second intermediate data generation module 81 obtains the relative trail data W and the first symbol G from the relative trail image memory 32, and the second symbol determination module 82 obtains the relative trail data W and the second symbol J' of the past from the relative trail image memory 32 (S410). Then, the second intermediate data generation module 81 checks the obtained value of G (S411 in FIG. 15), and when G=1 (that is, when the trail which include the detecting pixel is the relative trail of the approaching target object), the value of the relative trail data W of the pixel is set to the value of the second intermediate data H (S412).

When G=0 at the processing of S411, the second intermediate data generation module 81 compares the values of the comparison pixels a, b and c set in the above-described processing with the value of the relative trail data W to check whether the determination condition is satisfied (S413). When the predetermined condition is satisfied, the second intermediate data generation module 81 sets the value of the relative trail data W of the detecting pixel to the value of the second intermediate data H (S412). On the other hand, when the predetermined condition is not satisfied at the determination of S413, the second intermediate data generation module 81 sets the value of the second intermediate data H to 0 (S414).

The second intermediate data generation module 81 outputs the second intermediate data H to the second symbol determination module 82 and outputs it to the line memory 83 as well to store the second intermediate data H in the line memory 83 (S415). The second symbol determination module 82 checks whether the received value of the second intermediate data H is identical to the predetermined value S (S416). In this embodiment, the second symbol determination module 82 checks whether the value of the second intermediate data H is 255. When the value of the second intermediate data H is identical to the predetermined value S, the existence of the approaching target object is determined and the value of J is set to 1 (S417).

At the determination of S416, when the second intermediate data H is not identical to the predetermined value S, the second symbol determination module 82 checks whether the pixel is the one detected as the approaching target object existing pixel for the previous scan (S418). That is, in this embodiment, as described above, for detecting the current position of the approaching target object approaching from all the directions, the detection of the approaching target object existing pixel is repeated for four times while changing the scan direction when searching the relative trail data W stored in the relative trail image memory 32. However, the moving direction of the target object corresponding to the relative trail where the approaching target object can be detected may vary according to the scan direction. For this reason, when the pixel which has been marked with the second symbol J after being detected as the approaching target object and where the value of J has been set to 1 until now is no longer detected as the approaching target object after the scan direction is changed, the pixel concerned may be overwritten with 0. For preventing such a situation, even when the second intermediate data H is determined not to be identical to the predetermined value S at the determination of S416, the second symbol determination module 82 checks whether the value of the second symbol J' (the past value of J) stored in the relative trail mage memory 32 is 1 and whether the relative trail data W has the maximum value of 255 (S418). If these conditions are satisfied, the value of J is set to 1 (S417). When the past value of J' is not 1 at the determination of S418 (when J=1 has not been set according to the scanning of the past), the second symbol determination module 82 determines that the approaching target object does not exist and sets the value of J to 0 (S419).

Note that the reason why the determination is made whether the value of the relative trail data W is identical to the predetermined value S (255) at the determination of S418 is that there is a possibility that, even though the approaching target object no longer exists at the position of the pixel concerned, the value of J is set to 1 based on the data of one previous rotation of the radar antenna 1 and, thus, the value of J should be set to 0 in this case.

Then, the second symbol determination module 82 writes the value of J set at the processing of S417 or S419, into the relative trail image memory 32 (S420).

The second symbol J is set for each pixel by repeatedly carrying out the processing of S401 to S420 described above for all the pixels shown in FIG. 10. That is, J=1 is set for the pixels determined as the pixels with the approaching target objects, and J=0 is set for all the other pixels.

Next, a sequence of writing the second symbol J is described with reference to FIGS. 16A and 16B. FIG. 16A is a schematic diagram showing the writing of the first symbol G in the relative trail of the approaching target object. FIG. 16B is a schematic diagram showing the writing of the second symbol J in the current pixel of the approaching target object.

The relative trail determination processing module 33 detects the approaching target object heading toward the ship concerned by checking the relative trail data W on the sweep line, as shown in FIG. 16A (refer to flowchart of FIGS. 7 and 8). Next, the approaching target object detection processing module 34, as shown in FIG. 16B, tracks the relative trail data W of the approaching target object with the first symbol G being the origin, and when the relative trail data W reaches a pixel of the maximum value (that is, the approaching target object existing pixel), it marks the second symbol J on the pixel (refer to the flowchart of FIGS. 14 and 15). Thereby, the position where the approaching target object is present can be specified based on the first symbol G, and the second symbol J can be marked.

Next, the positional relation between the scanning direction and the detected position of the target object is described with reference to FIGS. 17A to 17D. In FIGS. 17A to 17D, the contents of the relative trail image memory 32 for storing the trails of the target objects A to D approaching the ship concerned are indicated conceptually. The target objects A, B, C and D are approaching straight toward the ship concerned from the upper left, upper right, lower left and lower right of the screen, respectively. All the target objects A to D correspond to the approaching target objects, and according to the processing of the relative trail determination processing module 33, the first symbols G is marked on a predetermined pixel on the trail of each of the target objects. Then, scanning is carried out in order of FIG. 17A, FIG. 17B, FIG. 17C and FIG. 17D for the stored contents of the relative trail image memory 32 (the relative trail data W described above).

Figure 17:
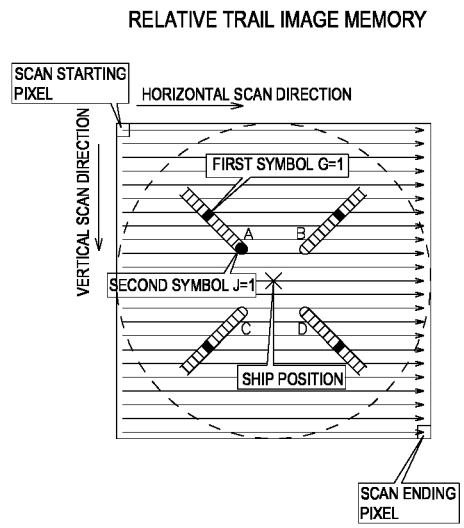
FIGS. 17A to 17D are schematic views showing the processing for writing the second symbol based on the first symbol for every scan direction.
Figure 17:
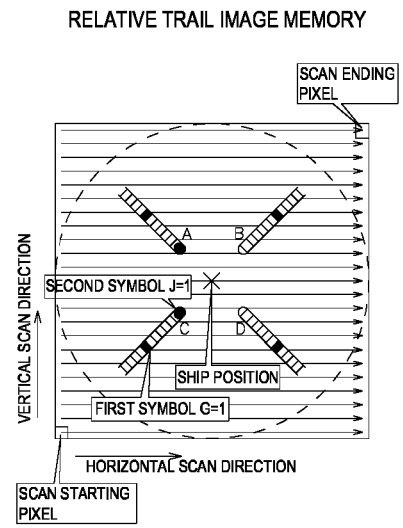
Figure 17:
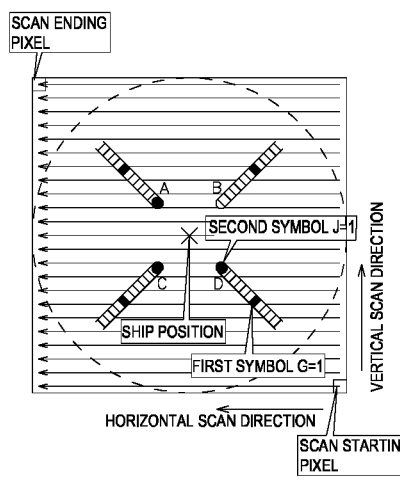
Figure 17:
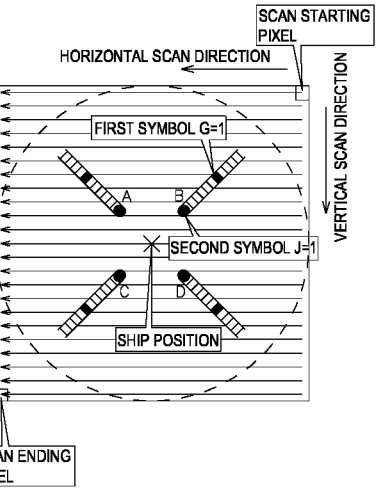

In FIG. 17A, the starting pixel is set to the pixel at the upper left corner and the ending pixel is set to the pixel at the lower right corner. Then, the scanning in the X-axis direction is performed to the right side. In this scanning, an existing position of a target object A which approaches from the upper left is detected. In FIG. 17B, the starting pixel is set to the pixel at the lower left corner and the ending pixel is set to the pixel at the upper right corner. Then, the scanning in the X-axis direction is performed to the right side. In this scanning, an existing position of a target object C which approaches from the lower left is detected.

In FIG. 17C, the starting pixel is set to the pixel at the lower right corner and the ending pixel is set to the pixel at the upper left corner. Then, the scanning in the X-axis direction is performed to the left side. In this scanning, an existing position of the target object D which approaches from the lower right is detected. In FIG. 17D, the starting pixel is set to the pixel at the upper right corner and the ending pixel is set to the pixel at the lower left corner. Then, the scanning in the X-axis direction is performed to the left side. The scanning in this direction, the existing position of the target object B which is approaching from the upper right.

In this way, it becomes possible to specify the current position of the approaching target object approaching from all the directions and to mark the second symbol J (to write J=1) by carrying out the detection processing in the quadruplicate scan direction. Further, since the relative trail image memory 32 is configured by the SDRAM or the like which can continuously access in the X-axis direction at high speed, the access to each pixel of the actual trail image memory 42 can be carried out with high efficiency and the detection of the moving target objects can be carried out at high speed. The pixel data in which the second symbol J is set is transmitted to the color palette 21 from the relative trail image memory 32 (omitted in FIG. 1), and the pixel in which the second symbol J (J=1) is set is displayed on the indicator 19 emphasizing that it differs from the other target objects. Thereby, for example, a screen display, in which the pixels corresponding to the positions at which the approaching target objects are present are colored in red whereas the target objects other than these are colored in blue, is possible.

Note that, instead of carrying out the detection of the current position of the approaching target objects in the quadruplicate scan direction described above, it is also possible to mark the second symbol J on the pixel which indicates the current position of the target object in the processing which sets the first symbol G shown in FIGS. 9A to 9D and FIG. 16A (processing along the sweep line). However, for example, in the example of FIG. 9A, when the relative trail data W is inputted in order of 0, 255, 254, 253, 252, 251, 250, and 249, the relative trail is determined to be the trail of the approaching target object when the value of W is inputted as 250. Therefore, at that point, if returning to a pixel in which 255 is inputted as the value of W to be marked with the second symbol J, the processing becomes complicated since the processing deviates from the rule of the processing procedure such as "from the starting point of the sweep line to the ending point (from left to right in FIG. 9A)." In this regard, in this embodiment, since the second symbol J is marked by carrying out the scanning processing separately, the processing related to the sweep line can be remarkably simplified.

Further, in this embodiment, the repetition of the scanning in quadruplicate direction during the processing for carrying out the detection of the current position of the approaching target object (the processing of marking the second symbol J) is carried out to simplify the detection process so that the rule of order of the processing pixels in respective scanning (for example, the rule of processing order of the pixels shown in FIG. 10) is followed.

Figure 18:
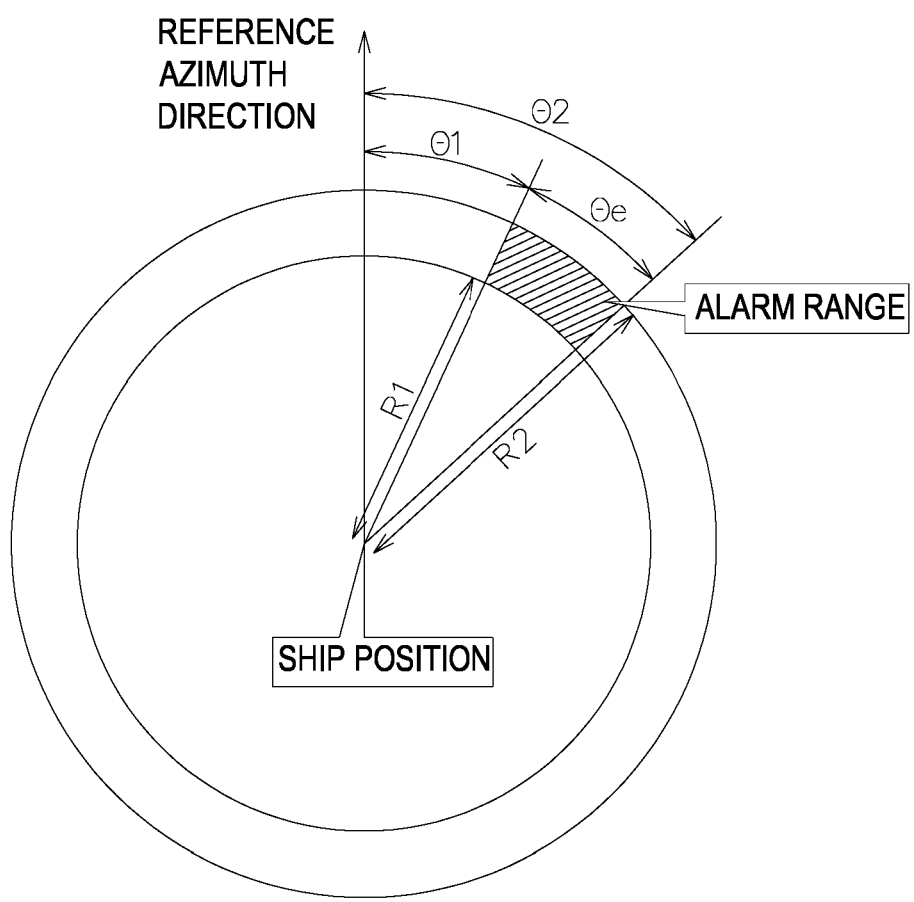
FIG. 18 is a schematic view showing a positional relation between a ship concerned and an alarm range.
Figure 19:
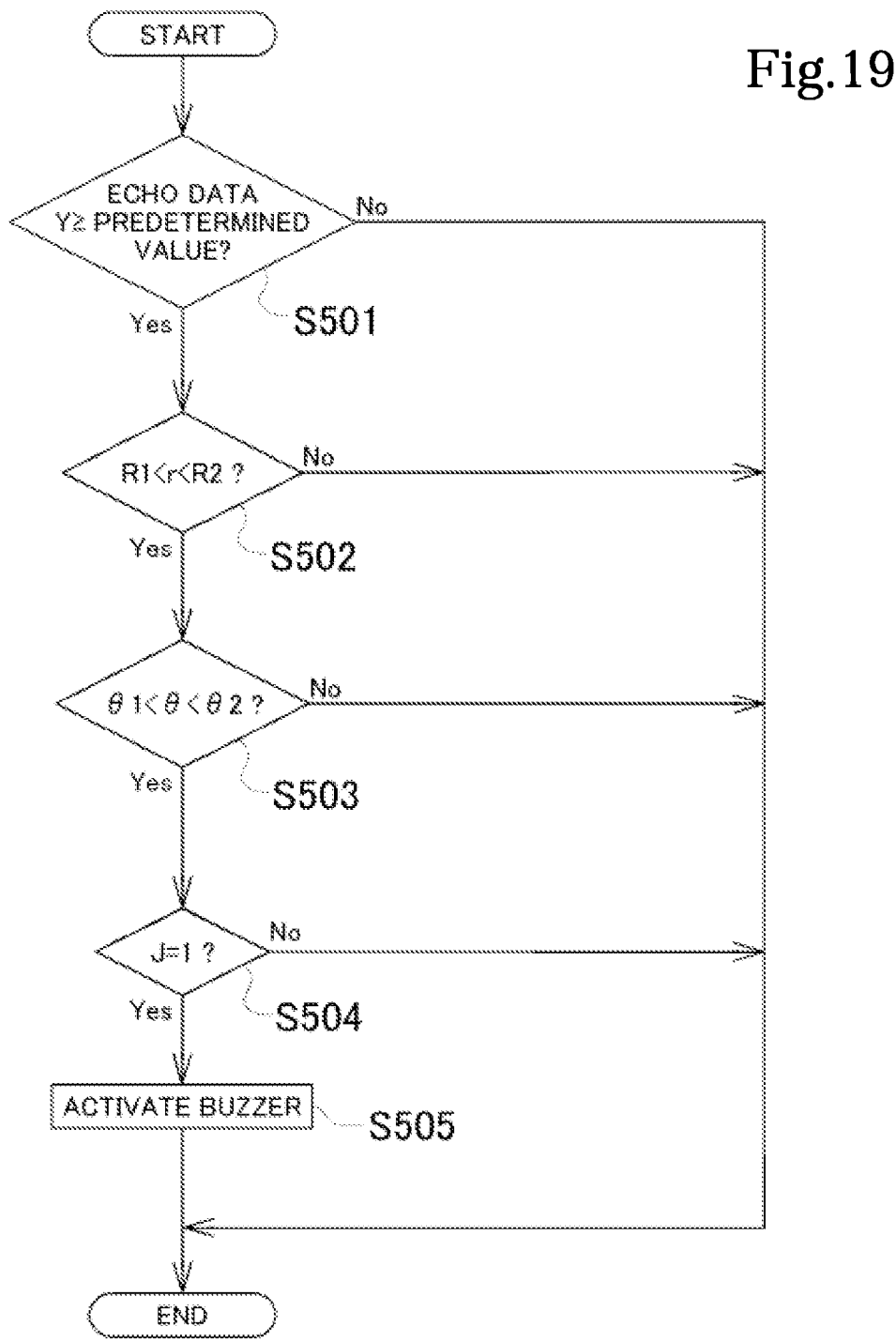
FIG. 19 is a flowchart showing processing for detecting whether an approaching target object exists in the alarm range.

Next, the alarm system provided in the radar apparatus 5 (image processing device 10) of this embodiment is described with reference to FIGS. 18 and 19. FIG. 18 is a schematic view showing a positional relation between the ship concerned and an alarm range. FIG. 19 is a flowchart showing processing for detecting the presence of the approaching target object within the alarm range.

As described above, the image processing device 10 to be mounted on the radar device 5 includes an alarm range determination module 36, a buzzer 23, and an alarm range setting module 37, as an alarm system. The alarm range determination module 36 determines if the approaching target object is present within the alarm range. The buzzer 23 is a sound device which is activated when the approaching target object enters the preset alarm range. With the alarm range setting module 37, operations such as setting and changing the alarm range, and switching an alarm function to ON/OFF can be performed by the operator.

As shown in FIG. 1, the echo data Y, the second symbol J, the distance "r" and the radar antenna angle θ are inputted to the alarm range determination module 36. Based on this information, the alarm range determination module 36 determines if the approaching target object is present within the alarm range. As shown in FIG. 18, R1, R2, θ1, and θ2 are set as parameters for setting the alarm range in the alarm range determination module 36. R1 and R2 determine a distance range in which the approaching target object is detected, and θ1 and θ2 are parameters to determine an angle range in which the approaching target object is detected.

Specific processing of an alarm system is described with reference to FIG. 19. When new echo data Y is inputted from the echo intensity calculation module 14, the alarm range determination module 36 begins the flow of FIG. 19. First, the alarm range determination module 36 checks whether the echo data Y is greater than the set value (S501). When the value of echo data Y is less than the set value, this flow is terminated.

At the processing of S501, the presence of approaching target object within the alarm range is checked if the value of the echo data Y is greater than the set value. First, the alarm range determination module 36 checks whether the distance r when the echo data Y is detected satisfies the condition of R1<r<R2 (S502). When the inputted distance r satisfies the condition, the alarm range determination module 36 checks whether the angle θ of the radar antenna 1 satisfies the condition θ1<θ<θ2 when the echo data Y is inputted (S503). On the other hand, when both the conditions of S502 and S503 are satisfied, the alarm range determination module 36 checks the value of J of the pixel corresponding to the echo data Y (S504). When the value of J is 1, since it implies that the approaching target object is present within the alarm range, the buzzer 23 is activated (S505). This flow will end without activating an informing module when any one of the conditions from S502 to S504 is not satisfied.

According to the above-described flow, an alarm system is achieved which reacts to only those target objects relatively approaching the ship concerned without reacting to the target objects moving away from the ship concerned. Note that, in the flow shown in FIG. 19, when the approaching target object is not detected, the flow is terminated without any processing being carried out particularly; however, this configuration may be changed appropriately. For example, processing for storing the fact that the approaching target object is not detected within the alarm range in an appropriate storage module can be carried out.

As described above, the image processing device 10 mounted on the radar apparatus of this embodiment is configured as follows. That is, the image processing device 10 includes the relative trail image memory 32 and the relative trail determination processing module 33. The relative trail image memory 32 is configured to store the group of the relative trail data W which indicates the relative positional change of the target object, with respect to the ship concerned (transmission position at which the detection signals are transmitted), which is detected by the echo signals obtained corresponding to the detection signals transmitted while changing the transmission azimuth direction. The relative trail determination processing module 33 determines whether the target object detected by the detection signals is the approaching target object approaching the ship concerned, from the group of the relative trail data W stored in the relative trail image memory 32, based on the relative trail data W which exist on the same sweep line.

Thereby, it can be determined whether the target object detected by the detection signals is the approaching target object by using the simple processing of checking the relative trail data on the same sweep line, without carrying out the complex calculation of considering the speed, the direction and the like. Therefore, the configuration for detecting the approaching target objects can be simplified and the cost reduction can be achieved.

Further, the image processing device 10 of this embodiment carries out the image processing so that the target object determined as the approaching target object by the relative trail determination processing module 33 is displayed so as to be distinguished from other target objects.

Thereby, since the approaching target objects are displayed so as to be distinguished from other target objects, the user can understand the approaching target object quickly and intuitively.

Further, the image processing device 10 of this embodiment can carry out the image processing for displaying the target objects and the relative trails of the target objects, based on the group of the relative trail data W.

Thereby, since the approaching target objects are displayed so as to be distinguished from other target objects, and since the relative trails which can easily identify if the target objects are approaching relatively are displayed, the presence of possibilities of collisions with the approaching target objects can be quickly determined. Further, since the approaching target objects are displayed so as to be distinguished from target objects which do not relatively change in position, a situation where discriminating between both the target objects becomes confusing can be prevented by displaying the relative trails along with the target objects.

Further, the image processing device 10 of this embodiment is configured as described below. That is, the relative trail data W is information generated per pixel which constitutes the relative trail image memory 32, and is information which changes in a stepwise fashion according to the time elapsed from the recent detection of the target object. When the target object (that is, the relative trail data W having the value of 255) is detected on the sweep line, as shown in the example of FIGS. 9A to 9D, the relative trail determination processing module 33 generates the intermediate data F which indicates the level to which the value of the relative trail data W will decrease continuously while maintaining the pixel continuity on the sweep line, in the direction moving away from the ship concerned (transmission position of the detection signals) considering the detection position as the origin. When the value of the intermediate data F is the set value T (when the value is changed while satisfying the predetermined condition), the relative trail determination processing module 33 determines that the pixel is included in the relative trail corresponding to the approaching target object.

Thereby, the detection accuracy of the target object having the actual risk of collision can be improved by setting the predetermined condition so as not to detect a smaller movement of the target object which are not required to be detected as the approaching target object.

Further, in the image processing device 10 of this embodiment, the set value T described above can be changed.

Thereby, the detection sensitivity of the approaching target object corresponding to the use situation can be set and the image processing device 10 can be operated with flexibility.

In addition, the image processing device 10 of this embodiment includes the approaching target object detection processing module 34 for obtaining a pixel which shows the current existence of an approaching target object of the relative trail (approaching target object existence pixel) from the pixels determined to be included in the relative trail corresponding to the approaching target object by the relative trail determination processing module 33 (the pixel marked with the first symbol G), based on the relative trail data group.

Thereby, the current position of the approaching target object which has the risk of collision with the ship concerned can de detected securely with the simple configuration.

Further, the image processing device 10 of this embodiment includes the alarm range determination module 36 for detecting the presence of the approaching target object within the alarm range set in advance, and the buzzer 23 for operating when the approaching target object is detected by the alarm range determination module 36.

Thereby, the alarm system which can informs the user only about the approaching target object which poses the actual risk of collision can be provided with the simple configuration.

Second Embodiment

Next, the radar device 5 equipped with an image processing device 210 of a second embodiment is described with reference to FIG. 20 to FIG. 26D. The image processing device 210 of the second embodiment is configured such that actual trails of target objects determined as the approaching target objects are displayed so as to be distinguished from actual trails of other target objects, when the actual trail based on the actual trail data Z stored in the actual trail image memory 42 is displayed on the indicator 19. Note that, in the description given below, the same reference numerals are used in the drawings for similar and identical configurations to those of the first embodiment, and their descriptions may be omitted.

Figure 20:
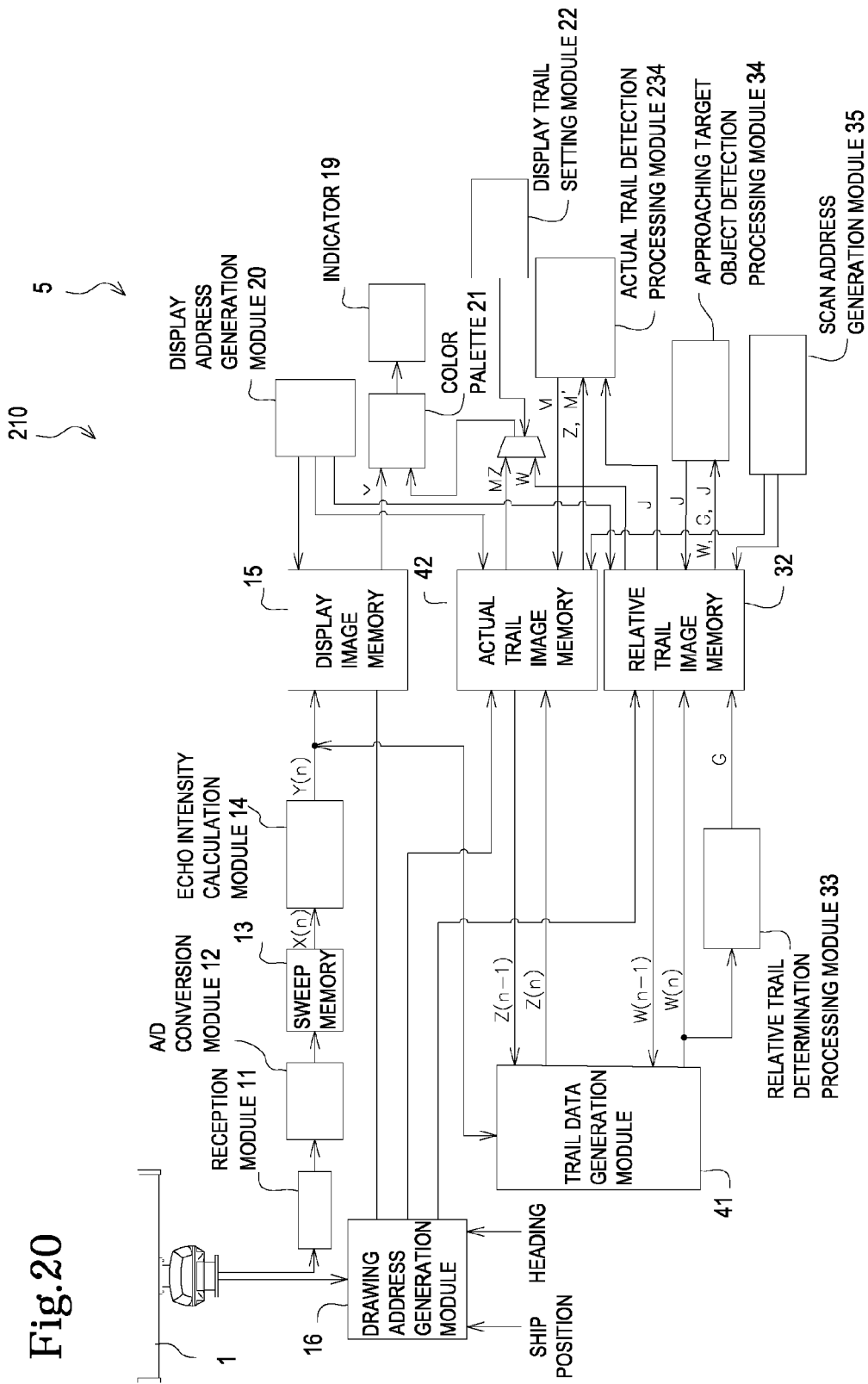
FIG. 20 is a block diagram schematically showing a configuration of a radar apparatus equipped with an image processing device according to a second embodiment of the invention.

FIG. 20 is a block diagram schematically showing a configuration of the radar device 5 equipped with the image processing device 210 of the second embodiment. The image processing device 210 shown in FIG. 20 is configured such that the approaching target objects can be detected in a way similar to that in the first embodiment. Note that, since the configuration for the processing for storing the first symbol G and the second symbol J in the relative trail image memory 32 is similar to the image processing device 10 of the first embodiment, the description is omitted.

As shown in FIG. 20, the image processing device 210 of the second embodiment, in addition to the configuration of the first embodiment, includes an actual trail detection processing module 234.

Further, in this embodiment, the actual trail image memory 42 is configured so as to store the presence of a symbol to be described later (third symbol M) for every pixel, besides the above-described actual trail data group.

Note that, the scanning address generation module 35 generates an actual trail address which is inputted to the actual trail image memory 42 at the same time when generating the relative trail address which is inputted to the relative trail image memory 32. Further, a plurality of pixels are arranged in the X-Y rectangular coordinate system in the actual trail image memory 42, exactly to the same as the relative trail image memory 32 (refer to FIG. 10), where the array size of the pixels (vertical M pixels, horizontal N pixels) is identical to that of the relative trail image memory 32. Further, in this embodiment, the scanning of the relative trail image memory 32 by the approaching target object detection processing module 34 and the scanning of the actual trail image memory 42 by the actual trail determination processing module 234 (details are described later) are carried out synchronously. In this synchronous scanning, the pixel of the relative trail image memory 32 accessed by the approaching target object detection processing module 34 and the pixel of the actual trail image memory 42 accessed by the actual trail determination processing module 234 are the pixels which have the same relation with the distance and the azimuth direction with respect of the position of the ship concerned.

The actual trail determination processing module 234 writes the third symbol M used for displaying the actual trail of the approaching target object so as to be distinguished from the other actual trails, to the actual trail image memory 42 based on the second symbol J stored in the relative trail image memory 32.

Figure 21:
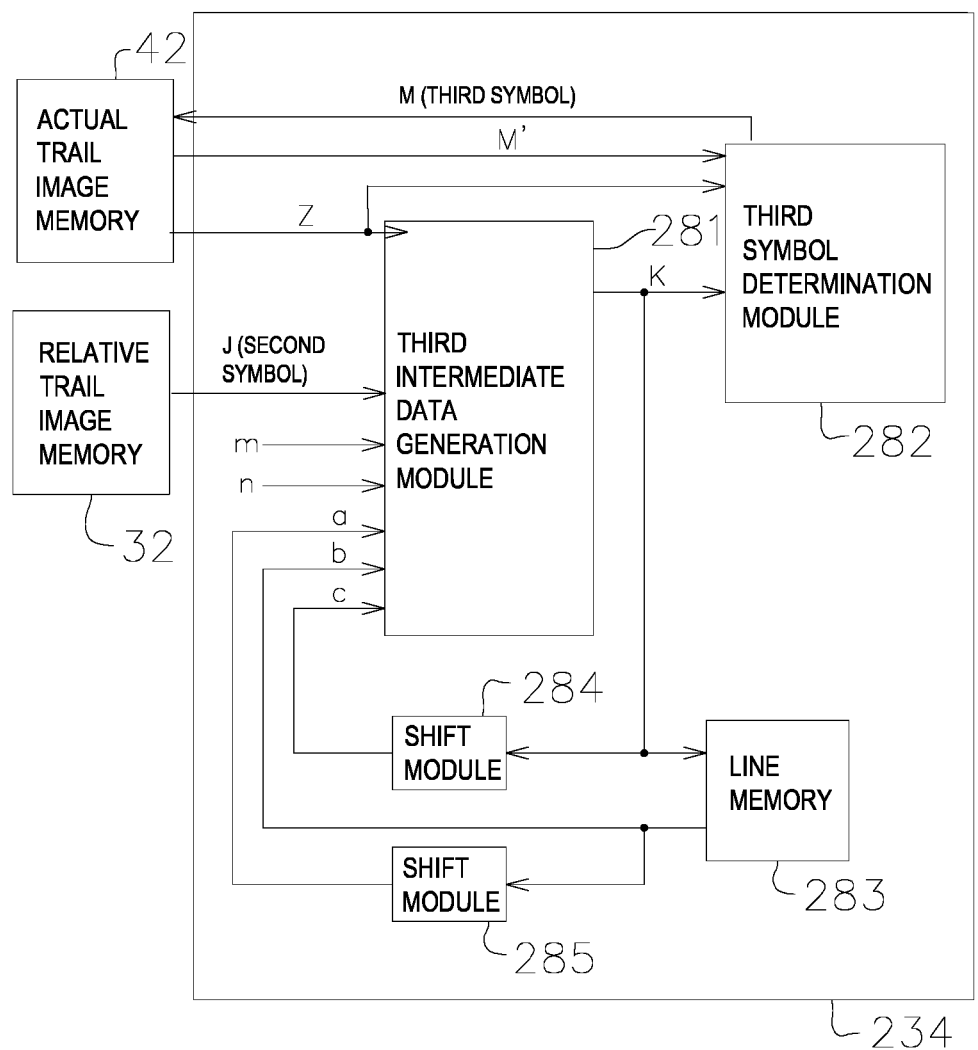
FIG. 21 is a block diagram showing a configuration of an actual trail detection processing module.

A configuration of the actual trail determination processing module 234 is described with reference to FIG. 21. FIG. 21 is a block diagram showing the configuration of the actual trail determination processing module 234. As shown in FIG. 21, the actual trail determination processing module 234 includes a third intermediate data generation module 281, a third symbol determination module 282, a line memory 283, and two shift modules 284 and 285.

The third intermediate data generation module 281 generates third intermediate data K for the third symbol determination module 282 to carry out determination for detecting the approaching target objects and their trails. To the third intermediate data generation module 281, the actual trail data Z is inputted from the actual trail image memory 42 and the second symbol J is inputted from the relative trail image memory 32.

Figure 22:
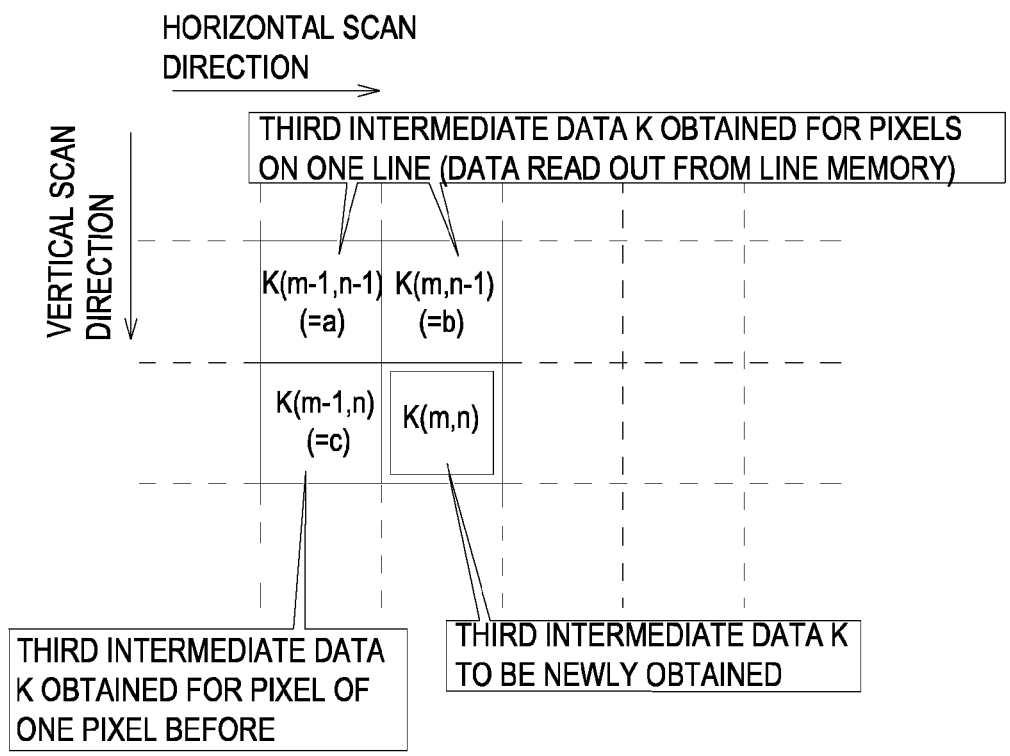
FIG. 22 is a schematic view showing positional relations between pixels used for comparison and a detecting pixel in the actual trail detection processing.

Further, the values of the comparison pixels a, b and c positioned near the detecting pixel in the actual trail image memory 42 are inputted to the third intermediate data generation module 281. As shown in FIG. 22, the positional relations between the comparison pixels a, b and c, and the detecting pixel are exactly the same as the positional relations between the comparison pixels a, b and c and the detecting pixel described for the relative trail image memory 32 in the first embodiment. The values of the comparison pixels a, b and c are the third intermediate data K generated before detecting the detecting pixel and it is set in the respective pixels. Further, the variables m and n for specifying the address of the detecting pixel are inputted to the third intermediate data generation module 281.

The third intermediate data generation module 281 reads out the contents of the relative trail image memory 32 (not the actual trail image memory 42) in accordance with the address of the detecting pixel, and when the second symbol J (J=1) which indicates that the detecting pixel is the approaching target object existing pixel is detected, the third intermediate data generation module 281 sets the actual trail data Z of the detecting pixel stored in the actual trail image memory 42 in the third intermediate data K.

Note that the actual trail data Z is stored in the actual trail image memory 42 whereas the relative trail data W is stored in the relative trail image memory 32. Here, the positional relations such as the distance from the position of the ship concerned to the position of the pixel in which the target object currently exists (that is, the position of the pixel where the value of 255 is set) and the direction between them, are the same for the actual trail image memory 42 and the relative trail image memory 32. Therefore, the values of the pixel positioned at the same distance and the same direction from the position of the ship concerned in the memory are equal for the relative trail image memory 32 and the actual trail image memory 42.

Using this, in this embodiment, the pixel of the actual trail image memory 42 corresponding to the pixel marked with the second symbol J in the relative trail image memory 32 (approaching target object existing pixel) is made to be the trigger pixel which serves as an origin for the marking processing. Note that the value of the actual trail data Z is always 255 in the trigger pixel. Then, the third symbols M are marked on the approaching target object and its entire actual trail, by tracking the value of the actual trail data Z with the trigger pixel being the origin. Further, for the actual trail image memory 42 in this embodiment, the scanning is repeated for four times while changing the scan direction (position of the starting pixel) in exactly the same principle as the scanning of the relative trail image memory 32 described in the first embodiment. Thereby, even if the approaching target object is moving to any direction, the third symbol M can be marked securely on the actual trail thereof.

Further, the third intermediate data generation module 281 compares the value of the actual trail data Z of the detecting pixel with the values of the comparison pixels, and even when the predetermined condition is satisfied, it sets the value of the actual trail data Z of the detecting pixel to the value of the third intermediate data K.

Specifically, when the value of the actual trail data Z is identical to at least one of the values of the comparison pixels a, b and c, or is smaller than the value of the comparison pixel by 1, the third intermediate data generation module 281 determines that the determination condition is satisfied. Note that this requires that the values of the comparison pixels are not 0.

In other words, the third intermediate data generation module 281 determines three conditions described below. That is, (1) for the value of the comparison pixel a, when a≠0, whether a relation of the actual trail data Z=a or Z=a−1 is established, (2) for the value of the comparison pixel b, when b≠0, whether a relation of Z=b or Z=b−1 is established, and (3) for the value of the comparison pixel c, when c≠0, whether a relation of Z=c or Z=c−1 is established. Then, if at least one of the relations of (1) to (3) is established, it can be concluded that the determination condition is satisfied.

The third symbol determination module 282 can write the third symbols M which indicate the existence of the approaching target object and its trail to the actual trail image memory 42, based on the value of the third intermediate data K. Based on the third intermediate data K, the third symbol determination module 282 sets M=1 to the pixel in which the approaching target object exists and the pixel which indicates the trail of the approaching target object, and M=0 to the other pixels, and then stores the values of M in the corresponding addresses to the actual trail image memory 42.

Figure 23:
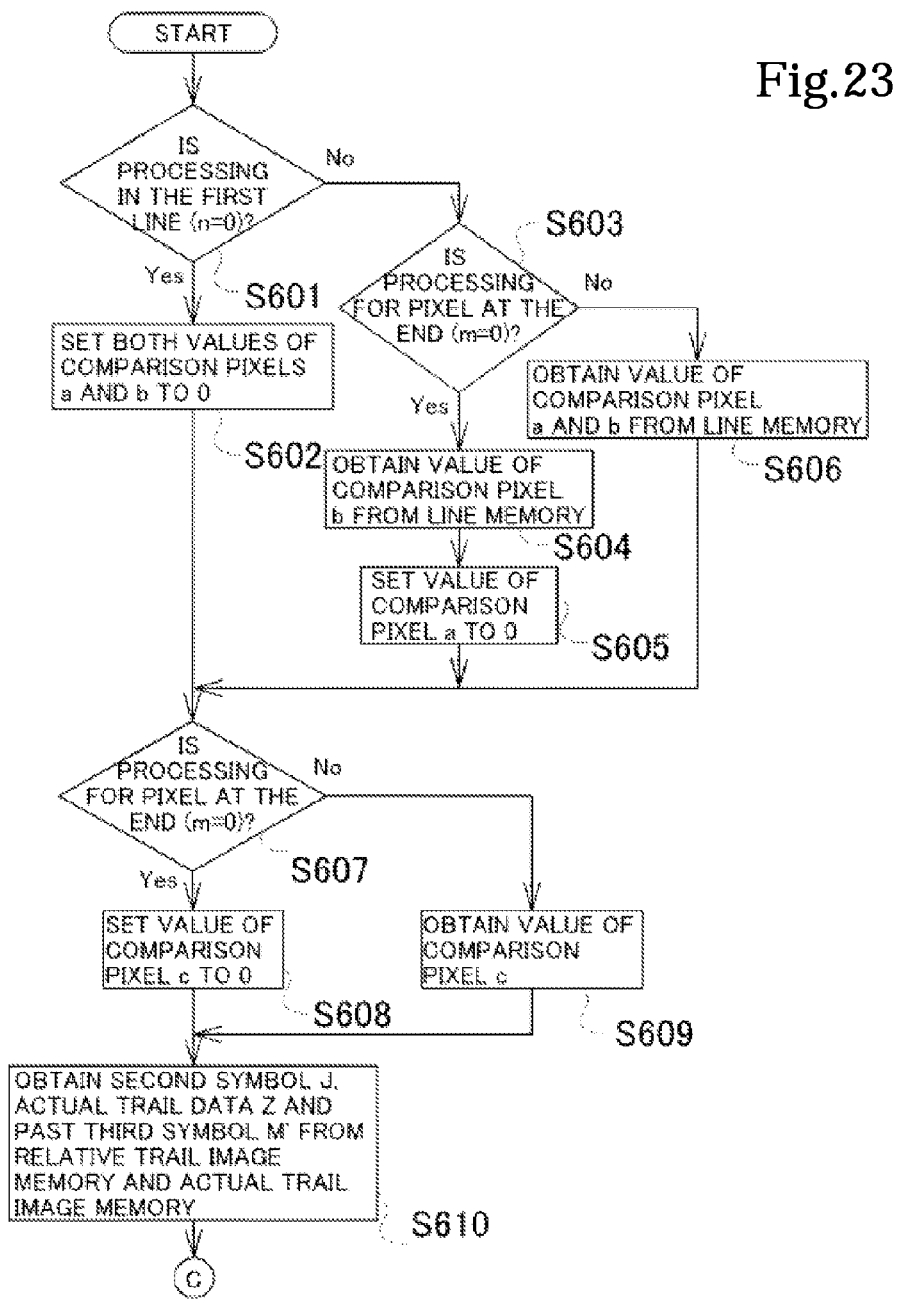
FIG. 23 is a flowchart showing the first half of processing for writing a third symbol.
Figure 24:
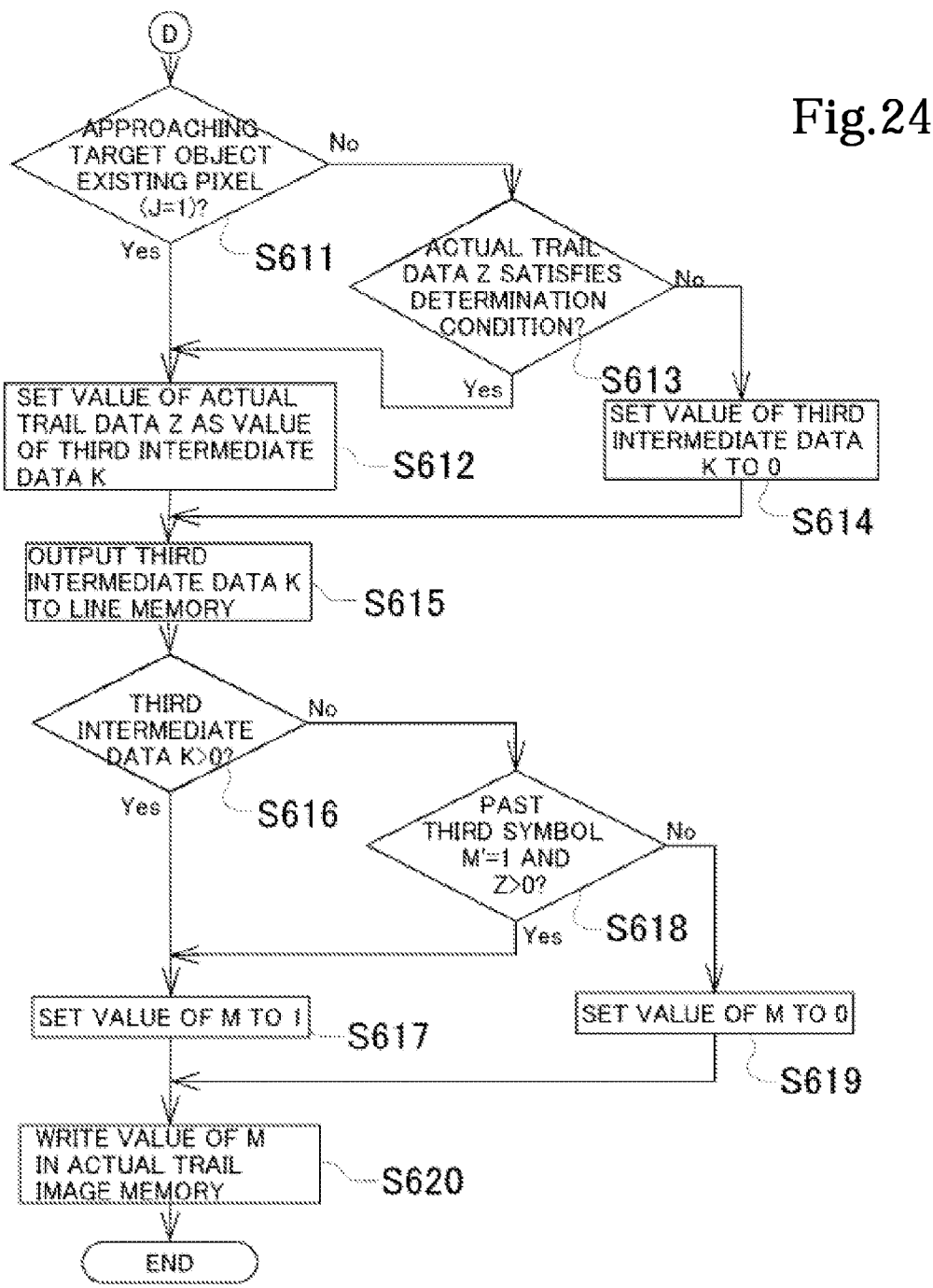
FIG. 24 is a flowchart showing the second half of the processing for writing the third symbol.

Specific processing for marking the third symbol M is described with reference to the flowchart of FIGS. 23 and 24. When the actual trail detection processing of the approaching target object starts, the flow of FIG. 23 starts. In the description given below, the address of the pixel in the actual trail image memory 42 which is currently under the detection processing may be expressed as (Xg+m, Yg+n). Note that a starting address of the starting pixel of the actual trail image memory 42 is assumed to be (Xg, Yg) whereas an ending address of the ending pixel is assumed to be (Xg+M−1, Yg+N−1). Further, the variable m satisfies the condition (M>m≥0) whereas the variable n satisfies the condition (N>n≥0).

The third intermediate data generation module 281 checks whether the processing is in the first line by checking whether the value of n which determines the Y-coordinate (Yg+n) of the detecting pixel is 0 (S601). When n=0, the values of the comparison pixels a and b are set to 0 (S602). When n≠0 (second line onwards), the third intermediate data generation module 281 checks whether the value of m is 0 for checking whether the pixel to be processed is at the left end (S603). When m=0, in other words, when the pixel to be processed is at the left end, the third intermediate data generation module 281 obtains the value of the comparison pixel b which is stored in the line memory 283 in advance (S604), and sets the value of the comparison pixel a to 0 (S605). On the other hand, when m≠0, the values of the comparison pixels a and b inputted to the line memory 283 in advance is obtained (S606).

Next, the third intermediate data generation module 281 sets the value of the comparison pixel c according to the value of m. More specifically, it checks whether the value of m which determines the X-coordinate (Xg+m) of the detecting pixel is 0 (S607). Then, when m=0, the value of c is set to 0 (S608). On the other hand, when m≠0, the value of the third intermediate data K which was delayed by the shift module 284 is set to the value of c (S609).

Next, the third intermediate data generation module 281 obtains the second symbol J from the relative trail image memory 32 and the actual trail data Z from the actual trail image memory 42, and further, the third symbol determination module 282 obtains the actual trail data Z and a third symbol M' of the past from the actual trail image memory 42 (S610). Then, based on the value of J, the third intermediate data generation module 281 checks whether the approaching target object exists in the pixel (S611), and when the approaching target object exists in the pixel (that is, when the pixels is the approaching target object, and when J=1), the value of the actual trail data Z is set to the value of the third intermediate data K (S612).

When the condition at the processing of S611 is not satisfied (when J=0), the third intermediate data generation module 281 compares the value of the actual trail data Z with the values of the comparison pixels a, b and c set by the above-described processing to check whether it satisfies the above-described determination condition (S613). When the determination condition is satisfied, the value of the actual trail data Z is set to the value of the third intermediate data K (S612). When the predetermined condition is not satisfied at the processing of S613, the value of the third intermediate data K is set to 0 (S614).

Next, the third intermediate data generation module 281 outputs the third intermediate data K to the third symbol determination module 282 and the line memory 283 as well to store the third intermediate data K in the line memory 283 (S615). The third symbol determination module 282 checks whether the value of the received third intermediate data K is greater than 0 (S616). When the third intermediate data K is greater than 0, the value of M at the pixel is set to 1 (S617). Thereby, M=1 is set (the third symbol M is marked) to the pixel in which the approaching target object and its actual trail data exist.

On the other hand, when the value of the third intermediate data K is 0 from the determination obtained from S616, the third symbol determination module 282 checks the value of M' (the value of M of the past) stored in the actual trail image memory 42 (S618). That is, in this embodiment, as described above, for detecting the actual trails of the approaching target objects moving in all the directions, the detection processing of the actual trail of the approaching target object is repeated for four times while changing the scan direction. However, the actual trail of the detectable approaching target object may vary according to the scan direction. For this reason, when the pixel which has been set to 1 for the value of M after being detected as the approaching target object or its actual trail until now is no longer detected as the approaching target object (actual trail) after the scan direction is changed, the value of M may be overwritten with 0. For preventing such a situation, even when the value of the third intermediate data K is 0 at the determination of S616, it is checked whether the value of M' which indicates the third symbol of the past is 1 and the value of the actual trail data Z is greater than 0 (S618). If these conditions are satisfied, the value of M is set to 1 (S617). On the other hand, when the past value of M' is not 1 at the determination of S618 (when M=1 has not been set according to the scanning of the past), the value of M is set to 0 (S619).

Note that the reason why the determination is made whether the value of the actual trail data Z is greater than 0 at S618 is that there is a possibility that, even though the target object and the actual trail no longer exists at the position of the pixel concerned, the value of M is set to 1 based on the data of one previous rotation of the radar antenna 1. In such a situation, the value of M should be set to 0.

The third symbol determination module 282 writes the value of M set at the processing of S617 or S619 into the actual trail image memory 42 (S620).

The third symbol M is set for each pixel of the actual trail image memory 42 by repeatedly carrying out the processing of S601 to S620 described above for all the pixels of the actual trail image memory 42. Then, the actual trails of the approaching target objects moving in all the directions can be detected and stored in the actual trail image memory 42 as the third symbols M by carrying out the detection processing for four times while changing the position of the starting pixel.

Figure 25A:
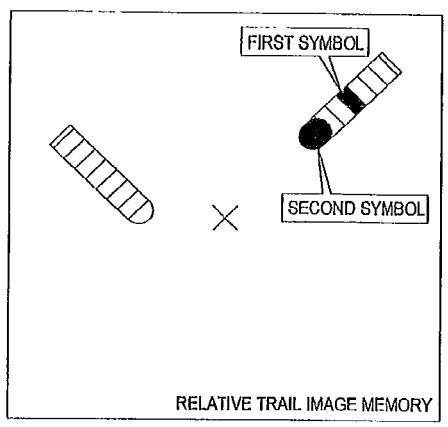
FIGS. 25A and 25B are schematic views showing processing for writing the third symbol based on the second symbol.
Figure 25B:
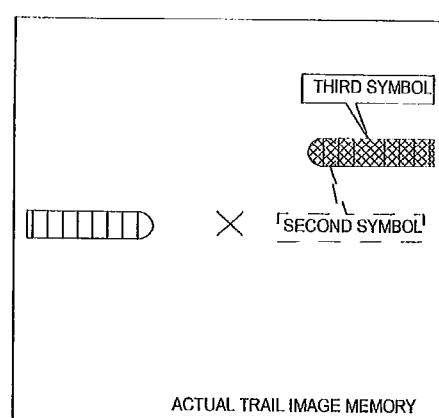
Figure 26:
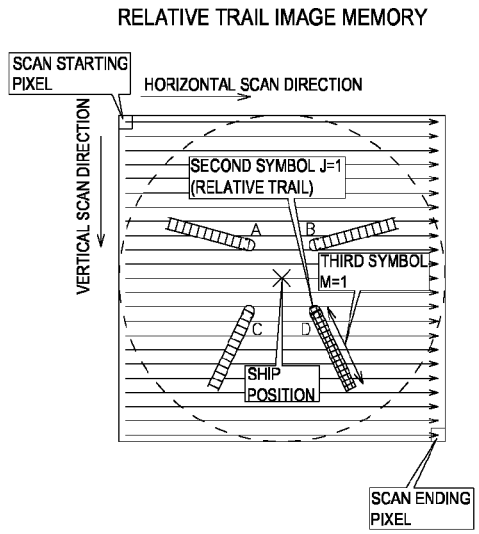
FIGS. 26A to 26D are schematic views showing the processing for writing the third symbol based on the second symbol for every scan direction.
Figure 26:
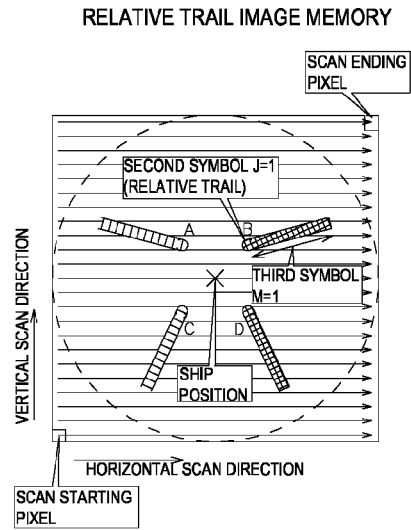
Figure 26:
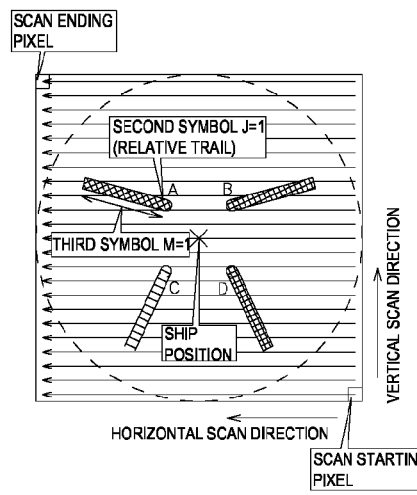
Figure 26:
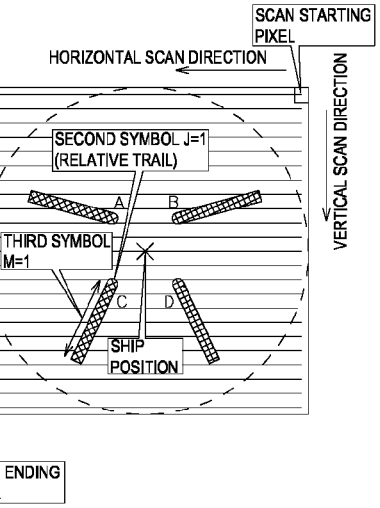

FIGS. 25A and 25B are schematic views showing the writing of the third symbol M based on the second symbol J. As shown in FIG. 25A, the image processing device 210 marks the first symbol G and the second symbol J on predetermined pixels in the relative trail image memory 32, based on the relative trail data W. Then, as shown in FIG. 25B, the image processing device 210 sets the third symbol M to the approaching target object and its actual trail, by tracking the actual trail from the pixel of the actual trail image memory 42 corresponding to the pixel marked with the second symbol J in the relative trail image memory 32.

Next, the change in the scan direction is described in more detail with reference to FIGS. 26A to 26D. FIGS. 26A to 26D schematically illustrate the contents of the actual trail image memory 42 which stores the trails of four target objects A, B, C and D which are approaching the ship concerned. The target object A and the target object B approach the ship concerned from upper left and upper right of the screen, respectively, whereas the target object C and the target object D approach the ship concerned from lower left and lower right of the screen, respectively.

Note that, in the example of the actual trail data shown in FIGS. 26A to 26D, it may appear that the target objects A to D are just passing near the ship concerned and will not collide with the ship concerned. However, since the ship concerned is moving in a reference azimuth direction (top of the screen) at a fixed speed in this example, the relative trail data corresponding to this example becomes as shown in FIGS. 17A to 17D. That is, it is difficult to understand in the actual trail data Z; however, any of the target objects A to D shown in FIGS. 26A to 26D may possibly correspond to the approaching target object and may pose a risk of collision with the ship concerned. Therefore, in the relative trail image memory 32, the second symbols J are marked on the pixels corresponding to the current positions of the target objects A to D, respectively, by the above-described approaching target object detection processing module 34.

The scanning of the actual trail image memory 42 is described as given below. At first, as shown in FIG. 26A, the starting pixel is set to the pixel at the upper left corner whereas the ending pixel is set to the pixel at the lower right corner, and then, the scan is carried out. By this scanning, the third symbols M (M=1) are set to the current position of the target object D and its trail. Next, as shown in FIG. 26B, the starting pixel is set to the pixel at the lower left corner whereas the ending pixel is set to the pixel at the upper right corner, and then, the scan is carried out. Thereby, the third symbols M (M=1) are set to the current position of the target object B and its trail. Subsequently, as shown in FIG. 26C, the starting pixel is set to the pixel at the lower right corner whereas the ending pixel is set to the pixel at the upper left corner, and then, the scan is carried out. Thereby, the third symbols M (M=1) are set to the current position of the target object A and its trail. At last, as shown in FIG. 26D, the starting pixel is set to the pixel at the upper right corner whereas the ending pixel is set to the pixel at the lower left corner, and then, the scan is carried out. Thereby, the third symbols M (M=1) are set to the current position of the target object C and its trail.

According to the processing described above, the third symbols M (M=1) can be set to the pixels corresponding to the approaching target objects approaching from all the directions and their trails, and stored in the actual trail image memory 42. In this embodiment, when the actual trail display mode is selected, the image data transmitted from the actual trail image memory 42 to the color palette 21 is displayed so that the pixels in which the third symbols M (M=1) are set are emphasized differentiating them from other target objects. Thereby, for example, such a screen display is possible that the target objects moving relatively straight toward the ship concerned (approaching target objects) and their actual trails are colored in red, and other target objects and their actual trail are colored in blue.

Note that, as described above, the scanning of the actual trail image memory 42 as shown in FIGS. 26A to 26D is carried out simultaneously and parallely with the scan of the relative trail image memory 32 as shown in FIGS. 17A to 17D. That is, the scanning address generation module 35 generates the relative trail scanning address for scanning the relative trail data stored in the relative trail image memory 32 and the actual trail scanning address for scanning the actual trail data stored in the actual trail image memory 42. Based on these scanning addresses, when the processing of the second symbol J is carried out for a pixel at a certain position in the relative trail image memory 32, the processing of the third symbol M is carried out in the actual trail image memory 42 for a pixel at a position (pixel position in the actual trail image memory 42) corresponding to the position of the pixel (pixel position in the relative trail image memory 32) in which the processing for the second symbol J is carried out. Therefore, the scans of FIGS. 17A and 26A are carried out parallely, and, next, the scans of FIGS. 17B and 26B are carried out parallely, and, in this way, both the scans of the trail image memory are carried out simultaneously. Thereby, the processing time can be reduced.

As described above, the image processing device 210 of this embodiment includes the actual trail image memory 42 that can store plural trail data as the actual trail data group indicating the absolute positional change of the target object. Further, the image processing device 210 carries out the image processing so that the actual trail of the target object along with that target object are displayed based on the actual trail data group.

Thereby, since it indicates the absolute positional change, even if the trail is displayed based on the actual trail data group which can not be determined quickly whether it is approaching relatively to the ship concerned (transmission position at which the radar antenna 1 transmits the detection signals), the approaching target object can be displayed so as to be distinguished from other target objects and, thus, the risk of collision can be determined quickly and intuitively.

Further, the image processing device 10 of this embodiment carries out the image processing so that the actual trail of the target object determined as the approaching target object by the relative trail determination processing module 33 is distinguished from other target objects.

Thereby, since not only the approaching target object but its trail is displayed so as to be distinguished from others, the risk of collision can be determined more intuitively. Note that, when the relative trail display mode is selected, it can be configured to carry out the image processing so that the relative trail of the approaching target object is displayed so as to be distinguished from the relative trails of other target objects.

The embodiments of the present invention are described above; however, the above-described configurations may be modified as follows.

The image processing device 10 of the first embodiment may be modified to a configuration that displays the relative trails only. Similarly, the image processing device 210 of the second embodiment may be modified to a configuration that displays the actual trails only. Further, the trails may be set in either of the image processing device 10 of the first embodiment or the image processing device 210 of the second embodiment in such a way that the trails are not displayed on the screen.

The alarm system of the radar device 5 equipped with the image processing device 10 in the first embodiment may be modified arbitrarily as per the circumstances as long as it is configured in such a way that the informing module starts operating when the approaching target object enters the alarm range. For example, the informing module may be changed from the buzzer 23 to an instrument such as a warning lamp or the like that visually appeals to the operator. Further, the indicator 19 may be changed to a configuration where characters such as "An approaching target object is detected!!" or the like are displayed.

The alarm range set in the alarm system is not limited to the shape as shown in FIG. 18. For example, the alarm range may be a range of a circle with a predetermined radius, having the center at the position of the ship concerned.

In the image processing device 210 of the second embodiment, the configuration that displays the approaching target object and its trail so as to be distinguished from each other may be changed arbitrarily as per the circumstances. For example, the configuration may be changed in such a way that only the current position of the approaching target object is displayed with a different color from that of other target objects, or for only the approaching target object, its current position (or its actual trail) is displayed using flash.

The image processing device 10 of this embodiment is configured to be equipped in the radar apparatus 5; however, it is not limited to this configuration. For example, it is possible to be configured so that the image processing device is arranged separately from the radar apparatus and the image processing device communicates with the radar apparatus to carry out the image processing.

In the above embodiments, the symbols (the first symbol G, the second symbol J, and the third symbol M) are set based on the value of the intermediate data (the intermediate data F, the second intermediate data H, and the third intermediate data K) set so as to maintain the continuity when the value of the relative trail data W or the actual trail data Z increases or decreases by 1 under the predetermined conditions. However, the setting method of the symbols is not limited to the methods of the above embodiments and may be changed arbitrarily as per the circumstances. Next, a modified example of the setting method of the symbols is described.

First, a modified example of the setting method for the first symbol G (setting of the intermediate data F) is described. For example, the relative trail determination processing module 33 may be configured to set the value of the intermediate data F based on the following conditions at the determination of S205 in FIG. 7. That is, at the determination of S205, the existence of the continuity is determined based on whether the value of the relative trail data W of the detecting pixel satisfies a relation of W=255−(F'+(0 to 2)). Then, if this relation is established, the existence of the continuity is determined to be satisfied and the intermediate data is set to an arbitrary value according to the value of the relative trail data so as to satisfy the continuity.

In this way, for a ship moving at low speed relatively toward the ship concerned, it can also be detected as the approaching target object by generating the intermediate data so as to have some freedom for the conditions when determining the existence of the continuity of the relative trail data W. More specifically, when a target object of interest is moving at low speed, the values of the relative trail data W are arranged from the side of the pixel where the target object exists (pixel with the pixel information value of 255), in the order of 252, 249, . . . . Even in such a situation, the intermediate data can be generated so as to have the continuity by adopting the above method. Thereby, the target objects moving at low speed can be detected as the approaching target objects more securely.

Next, a method of generating the intermediate data for enabling to detect the continuity considering the adjacent pixels is described. For example, a target object may move relatively for 2 pixels or more within one rotation of the radar antenna 1. In such a situation, the values of the trail data set by the trail data generation module 41 are arranged on the sweep line in order of 255, 0, 254, 0, 253, . . . , therefore, even when this is actually a target object moving relatively toward the ship concerned, the values of the relative trail data W which are adjacent to each other on the sweep line may not have the continuity.

In such a situation, by taking the adjacent pixels in consideration, the intermediate data can be generated so as to enable the detection of the continuity. More specifically, a pixel where 0 is detected is compared with an adjacent pixel on the sweep line, and when the values of the relative trail data W of the pixels which interpose 0 therebetween in the sweep line direction has the continuity, the intermediate data F is generated according to the value of the relative trail data of the pixels which interpose 0 therebetween. For example, when the values of the relative trail data W are arranged in the sweep line direction in order of 254, 0 and 253, the values of the relative trail data W of the pixels located so as to interpose 0 therebetween (which are 254 and 253) in the sweep line direction are compared. Since 254 and 253 has the continuity, the intermediate data F is generated so as to have the continuity based on the value of 253 (or 254) in the 0 pixel.

Note that the allowable number of zeros which exist in-between may be set arbitrary according to the radar display range or the number of pixels for the image memory. For example, even in a case where the values of the relative trail data W are arranged in order of 254, 0, 0 and 253, by assuming that the values of the relative trail data have the continuity based on the values of 254 and 253 which interpose 0, the intermediate data corresponding to that value can be generated. Thereby, even when the target object is moving at a relatively high speed, the target object can be determined as the approaching target object.

Next, a modified example of the setting method of the second symbol J (setting of the second intermediate data H) is described. For example, in the setting method of the second symbol J, the determination condition of the processing of S413 in FIG. 15 may be set as follows. That is, the determination condition is set so as to determine that the continuity is satisfied when the value of the comparison pixel a is a≠0 and a condition of the relative trail data W=a or W=a+(1 to 3) is satisfied. Note that, even for the comparison pixels b and c, the conditions are set similar to the comparison pixel a. When the second intermediate data H, which is set based on the determination conditions, matches with the predetermined value S, the second symbol J is marked on the pixel (J=1 is set). By setting the determination conditions like this, even when a target object of interest is moving at low speed, the second symbol J can be appropriately marked on the pixel corresponding to the approaching target object. Note that, even in the setting method of the second symbol J, similar to the modified example of the setting of the first symbol G, it is possible to be applied to the target object moving at high speed by carrying out the processing which allows 0.

Further, the setting method of the third symbol M of the second embodiment may also be configured so as to generate the third intermediate data K by allowing some freedom to the conditions. For example, in the setting method of the third symbol M, the determination condition of the processing of S613 in FIG. 24 may be set as follow. That is, when the condition of the actual trail data Z=a or Z=a−(1 to 3) is satisfied, the value of the actual trail data Z is set to the value of the third intermediate data K, and on the other hand, when the condition is not satisfied, the value of the third intermediate data K is set to 0. Note that, even for the comparison pixels b and c, conditions similar to the comparison pixel a of this modified example are set. By setting the determination conditions like this, even when the target object of interest is moving at low speed, the third symbol M can be appropriately marked on the pixel corresponding to the approaching target object and its trail. Note that, even in the setting method of the third symbol M, similar to the modified example of the setting of the first symbol G, it is possible to be applied to the target object moving at high speed by carrying out the processing which allows 0.

In the foregoing specification, specific embodiments of the present invention have been described. However, one of ordinary skill in the technique appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relation or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:
1. An image processing device, comprising:
an actual trail image memory that stores an actual trail data group indicating absolute changes in position of a target object detected by echo signals obtained corresponding to detection signals transmitted while changing an azimuth direction of the transmission;
a relative trail image memory that stores a relative trail data group indicating relative changes in position of the target object with respect to a transmission origin location of the detection signals; and
an approaching target object determination processor that determines whether the target object detected with the detection signals is an approaching target object based on the relative trail data group;
wherein an actual trail of the target object is displayed along with the target object, the displayed actual trail being based on the actual trail data group; and
wherein the target object determined to be the approaching target object by the approaching target object determination processor is displayed so as to be distinguished from another target object with a relative trail substantially similar to that of the approaching target object.
2. The image processing device of claim 1, wherein a relative trail of the target object is displayed along with the target object based on the relative trail data group.
3. The image processing device of claim 1, wherein the actual trail of the target object determined to be the approaching target object by the approaching target object determination processor is displayed so as to be distinguished from another target object.
4. The image processing device of claim 1, wherein the relative trail data is information that is generated per pixel and stored in the relative trail image memory and where the relative trail data varies in a stepwise fashion based on a time elapsed between detections of the target object, and
wherein the approaching target object determination processor includes a generated pixel in a relative trail of the target object in response to a determination that
the target object is detected on a sweep line, which represents a straight line of pixels formed by reception data successive in a distance direction obtained from a single detection signal that is transmitted and received, and
and a value of the relative trail data varies along the pixels on the sweep line in a direction away from the transmitting position, using a most recent target object detection position as a starting point, and the variation in relative trail data value satisfies a predetermined condition.

5. The image processing device of claim 4, wherein the predetermined condition is configured to be changeable.

6. The image processing device of claim 4, comprising an approaching target object position acquisition module that finds a pixel at which the approaching target object of the relative trail currently exists based on the relative trail data group from the pixels determined to be included in the relative trail corresponding to the approaching target object by the approaching target object determination processor.

7. The device of claim 4, where the approaching target determination processor determines that a value of the relative trail data varies along the pixels on the sweep line in a direction away from the transmitting position, using a most recent target object detection position as a starting point and using a first reference pixel within a display area, a second reference pixel within the display area, a third reference pixel within the display area, and a fourth reference pixel within the display area, where the value of the relative trail data is determined to vary in response to an evaluation indicating that the value of the relative trail data varies from the starting point with respect to one or more of the reference pixels.

8. The image processing device of claim 4, wherein the predetermined condition includes a minimum variation threshold such that variation in relative trail data not meeting the minimum threshold does not satisfy the predetermined condition.

9. The image processing device of claim 1, comprising:
an alert range determination module that detects the approaching target object existing within an alert range set in advance; and
an informing module that operates in response to a detection of the approaching target object by the alert range determination module.

10. A radar apparatus equipped with the image processing device of claim 1.

11. The device of claim 1, where the approaching target object determination processor accesses the relative trail image memory to display the target object at a first timing and accesses the relative trail image memory to perform said determining at a second timing different from the first timing.

12. The device of claim 1, where the determination processor performs said determining by:
selecting a first starting pixel within a display area;
first accessing the relative trail image memory to first evaluate a sweep line with respect to the first starting pixel, the sweep line representing a straight line of pixels formed by reception data successive in a distance direction obtained from a single detection signal that is transmitted and received;
selecting a second starting pixel within the display area;
second accessing the relative trail image memory to second evaluate the sweep line with respect to the second starting pixel;
selecting a third starting pixel within a display area;
third accessing the relative trail image memory to third evaluate the sweep line with respect to the third starting pixel;
selecting a fourth starting pixel within the display area;
fourth accessing the relative trail image memory to fourth evaluate the sweep line with respect to the fourth starting pixel; and
determining whether the target object detected with the detection signals is an approaching target object that approaches the transmitting position based on outcomes of the first, second, third, and fourth evaluating;
where the first, second, third, and fourth starting pixels are not included in the sweep line.

13. A method of processing an image, comprising:
acquiring echo signals obtained corresponding to detection signals transmitted while changing a transmitting azimuth direction;
generating, as pixel data, a relative trail data group indicating relative changes in position of a target object detected with the echo signals, with respect to a transmitting position from which the detection signals are transmitted, where the pixel data represents relative movement of the target object along a sweep line, which is a straight line including two or more pixels representing detections of the target object at different times;
determining, with a processor, whether the target object detected with the detection signals is an approaching target object that approaches the transmitting position based on whether a value of pixel data representing relative trail data on the particular sweep line varies along that sweep line;
displaying the target object determined to be the approaching target object on a display so that the target object determined to be the approaching target object is distinguished from another target object displayed on the display; and
displaying an actual trail of the target object on the display along with the target object, the displayed actual trail being based on an actual trail data group indicating absolute changes in position of the target object detected with the echo signals.

14. The method of claim 13, the method further comprising:
displaying the target object based on the relative trial data, said displaying including first accessing, at a first timing, a relative trail image memory that stores the relative trail data group; and
where said determining includes accessing, at a second timing different from the first timing, the relative trail image memory that stores the relative trail data group.

15. The method of claim 13, said determining including:
selecting a first starting pixel within a display area;
first evaluating the sweep line with respect to the first starting pixel;
selecting a second starting pixel within the display area;
second evaluating the sweep line with respect to the second starting pixel;
selecting a third starting pixel within a display area;
third evaluating the sweep line with respect to the third starting pixel;
selecting a fourth starting pixel within the display area;
fourth evaluating the sweep line with respect to the fourth starting pixel; and
determining whether the target object detected with the detection signals is an approaching target object that approaches the transmitting position based on outcomes of the first, second, third, and fourth evaluating;
where the first, second, third, and fourth starting pixels are not included in the sweep line.

16. An image processing device, comprising:
an actual trail image memory that stores an actual trail data group indicating absolute changes in position of a target object detected by echo signals obtained corresponding to detection signals transmitted while changing an azimuth direction of the transmission;
a relative trail image memory that stores a relative trail data group indicating relative changes in position of the target object with respect to a transmission origin location of the detection signals; and an approaching target object determination means for determining whether the target object detected with the detection signals is an approaching target object based on the relative trail data group;

wherein an actual trail of the target object is displayed along with the target object, the displayed actual trail being based on the actual trail data group; and wherein the target object determined to be the approaching target object by the approaching target object determination means is displayed so as to be distinguished from another target object with a relative trail substantially similar to that of the approaching target object.

17. The image processing device of claim 16, wherein the relative trail data is information that is generated per pixel and stored in the relative trail image memory and where the relative trail data varies in a stepwise fashion based on a time elapsed between detections of the target object, and wherein the approaching target object determination means includes a generated pixel in a relative trail of the target object in response to a determination that the target object is detected on a sweep line, which represents a straight line of pixels formed by reception data successive in a distance direction obtained from a single detection signal that is transmitted and received, and and a value of the relative trail data varies along the pixels on the sweep line in a direction away from the transmitting position, using a most recent target object detection position as a starting point, and the variation in relative trail data value satisfies a predetermined condition.

18. The image processing device of claim 16, comprising an approaching target object position acquisition means for finding a pixel at which the approaching target object of the relative trail currently exists based on the relative trail data group from the pixels determined to be included in the relative trail corresponding to the approaching target object by the approaching target object determination processing means.

* * * * *